(12) United States Patent
Sarkar

(10) Patent No.: US 12,379,915 B2
(45) Date of Patent: Aug. 5, 2025

(54) PERFORMING SECURITY FUNCTIONS USING DEVICES HAVING EMBEDDED HARDWARE SECURITY MODULES

(71) Applicant: Micron Technology, Inc., Boise, ID (US)

(72) Inventor: Sourin Sarkar, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 500 days.

(21) Appl. No.: 17/858,568

(22) Filed: Jul. 6, 2022

(65) Prior Publication Data

US 2023/0391345 A1 Dec. 7, 2023

Related U.S. Application Data

(60) Provisional application No. 63/347,825, filed on Jun. 1, 2022.

(51) Int. Cl.
| | |
|---|---|
| *B60W 60/00* | (2020.01) |
| *B60W 50/02* | (2012.01) |
| *G06F 8/65* | (2018.01) |
| *G06F 21/57* | (2013.01) |
| *G06F 21/86* | (2013.01) |
| *H04W 4/40* | (2018.01) |

(52) U.S. Cl.
CPC ................ *G06F 8/65* (2013.01); *G06F 21/57* (2013.01); *G06F 21/86* (2013.01); *H04W 4/40* (2018.02)

(58) Field of Classification Search
CPC ............ G06F 21/57; G06F 21/86; G06F 8/65; H04W 4/40; B60W 50/0205; B60W 50/023; B60W 60/00186; B60W 60/00188
See application file for complete search history.

(56) References Cited

U.S. PATENT DOCUMENTS

| | | | | |
|---|---|---|---|---|
| 2018/0006829 A1* | 1/2018 | Kravitz | ................. | H04W 12/06 |
| 2019/0207915 A1* | 7/2019 | Schaap | ................. | H04L 9/0891 |
| 2021/0152341 A1* | 5/2021 | Park | ........................ | G06F 21/71 |
| 2022/0131842 A1* | 4/2022 | Zhang | ..................... | G06F 21/57 |
| 2023/0129539 A1* | 4/2023 | Dover | ..................... | G06F 21/71 |
| | | | | 711/154 |

\* cited by examiner

*Primary Examiner* — Joseph P Hirl
*Assistant Examiner* — Aayush Aryal
(74) *Attorney, Agent, or Firm* — Harrity & Harrity, LLP

(57) ABSTRACT

In some implementations, a host processor associated with a vehicle may select, from a plurality of devices that are configured to communicate with the host processor for performing security functions, a first device to serve as a primary device and a second device to serve as a secondary device. The first device may include a first memory with an embedded hardware security module and may be associated with a first set of nodes of the vehicle. The second device may include a second memory with an embedded hardware security module and may be associated with a second set of nodes of the vehicle. The host processor may determine, based on a signal, a failure associated with the first device or the second device. The host processor may initiate a remediation process based on the failure associated with the first device or the second device. Numerous other implementations are described.

24 Claims, 15 Drawing Sheets

300

1200 →

Device(s)
1205

Host Processor
1210

Network
1220

Node(s)
1215

FIG. 12

PERFORMING SECURITY FUNCTIONS USING DEVICES HAVING EMBEDDED HARDWARE SECURITY MODULES

CROSS-REFERENCE TO RELATED APPLICATION

This patent application claims priority to U.S. Provisional Patent Application No. 63/347,825, filed on Jun. 1, 2022, and entitled "PERFORMING SECURITY FUNCTIONS USING DEVICES HAVING EMBEDDED HARDWARE SECURITY MODULES." The disclosure of the prior application is considered part of and is incorporated by reference into this patent application.

TECHNICAL FIELD

The present disclosure generally relates to network security and, for example, to performing security functions using devices having embedded hardware security modules.

BACKGROUND

A vehicle may have a number of sensors which operate to support functional features of the vehicle. The sensors may generate and store data to support the functional features of the vehicle. The sensors may communicate the data within the vehicle and outside of the vehicle to support the functional features of the vehicle.

BRIEF DESCRIPTION OF THE DRAWINGS

FIG. 12 is a diagram of an example environment in which systems and/or methods described herein may be implemented.

DETAILED DESCRIPTION

Figure 1:
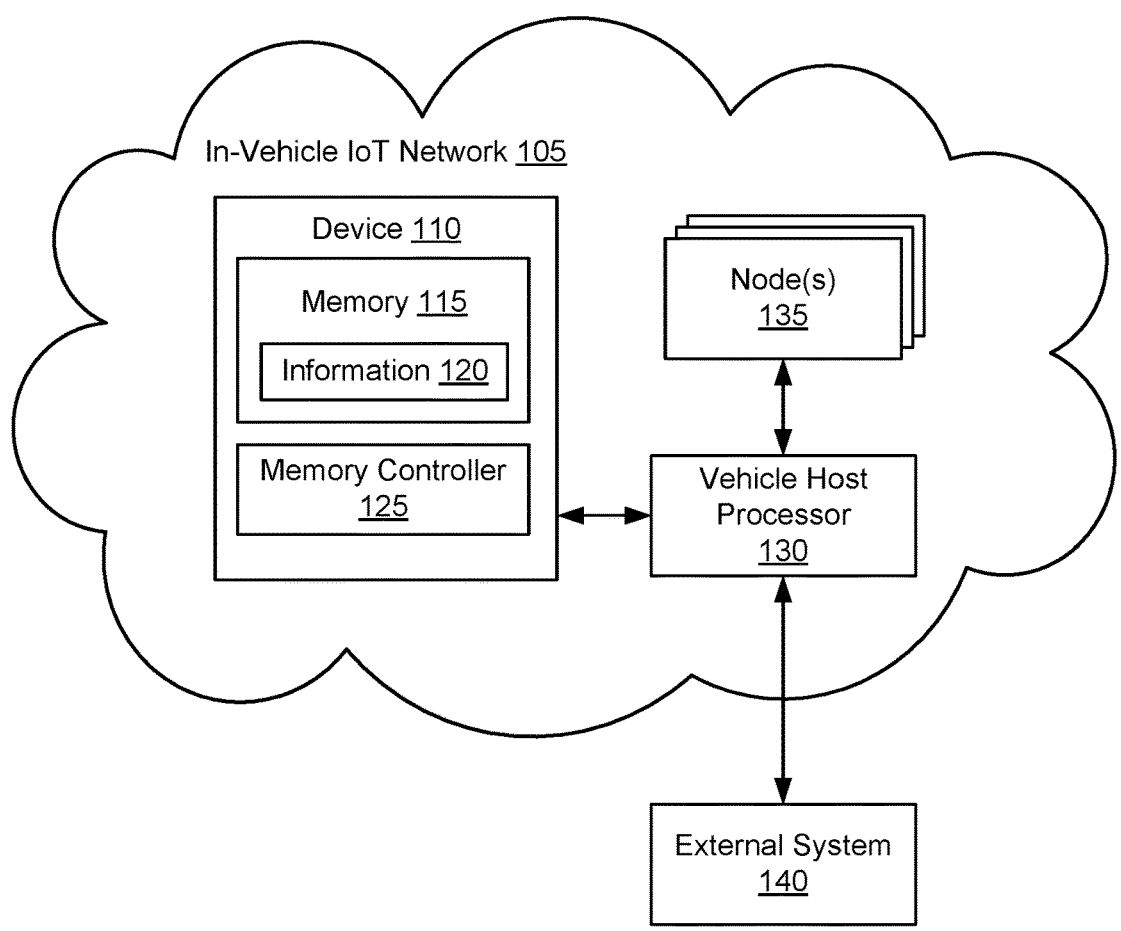
FIG. 1 is a diagram illustrating an example of an in-vehicle Internet of Things (IoT) network that includes a device with a memory having an embedded hardware security module.

A vehicle, such as an autonomous vehicle or a non-autonomous vehicle, may have a number of sensors, controllers, and intelligent functional nodes, which may operate to support functional features (e.g., safety features, such as automatic braking or blind spot monitoring) of the vehicle. The sensors may be included in an in-vehicle Internet of Things (IoT) network (or an in-vehicle sensor network). The sensors may generate and store data to support the functional features of the vehicle. The sensors may communicate the data within the in-vehicle IoT network and outside of the in-vehicle IoT network to support the functional features of the vehicle. The data may include real-time sensor data, sensitive user data, and/or sensor configurations and parameters. The controllers and/or the intelligent functional nodes may control various components of the vehicle, such as motors, switches, actuators, and so on. In an autonomous vehicle, the controllers and/or the intelligent functional nodes may also control components of the vehicle used for autonomous driving, such as accelerating components, braking components, steering components, and so on.

The vehicle may be a connected vehicle that supports various communication protocols, such as a vehicle-to-everything (V2X) protocol, a vehicle-to-infrastructure (V2I) protocol, a vehicle-to-network (V2N) protocol, a vehicle-to-vehicle (V2V) protocol, a vehicle-to-pedestrian (V2P) protocol, a vehicle-to-device (V2D) protocol, and/or a vehicle-to-grid (V2G) protocol.

Such vehicles may be vulnerable to an attack. Typical security vulnerabilities of the in-vehicle IoT network may include active passenger safety modules, active vehicle stability control modules, advanced driver-assistance systems (ADAS) modules (e.g., lane assist, autonomous breaking, pedestrian detection, blind spot warning, and other functions), climate control modules, emergency communication modules, in-vehicle location services modules, electrical modules of the vehicle, telemetry modules of the vehicle, and/or electronic control units of the vehicle. When such modules of the vehicle are compromised, vehicle safety cannot be ensured and a risk may be posed to users of the vehicle and to others outside of the vehicle. Furthermore, the attack may result in malicious access to stored data, malicious configuration changes to functional nodes, malicious firmware changes, and/or malicious access to interconnected communications. The attack may occur during manufacturing of the vehicle, when passengers are traveling within the vehicle, or when the vehicle is interacting with an infrastructure or nearby vehicles.

The vehicle may have a complex network of different components and modules, which may include dumb nodes, semi-intelligent nodes, sensor nodes, and highly intelligent nodes with high computing potential inside of the vehicle. Such complexity may result in various problems, such as eliminating a single point of failure and increased difficulty in ensuring security for a complete system (e.g., the entire in-vehicle IoT network). Today, security approaches are fragmented and may be tailored to specific components or modules, but may be insufficient for securing the complete system.

To solve the problems described above, as well as to provide security to the in-vehicle IoT network, a technical solution is described herein for performing security functions for the in-vehicle IoT network of a vehicle. A device of the in-vehicle IoT network, which may be referred to as a trusted authority (TA), may include a memory with an embedded hardware security module and a memory controller. The device may receive, from a host processor (e.g., a vehicle host processor) associated with the in-vehicle IoT network, a registration configuration during an initial provisioning of the device that configures the device to serve as a root of trust for the host processor (e.g., by storing cryptographic keys, by performing cryptographic functions, and/or by enabling a secure boot process). The device may receive, from the host processor, information associated with a node of the in-vehicle IoT network and/or a user of the vehicle associated with the in-vehicle IoT network. The device may store, via the memory controller, the information in the memory with the embedded hardware security module. The device may serve as the root of trust for the host processor using the information stored in the memory. The device may receive, from the host processor, a request to perform a security function. The device may perform, based on the request, the security function for the in-vehicle IoT network in conjunction with the host processor using the information stored in the memory. The device may generate an alert based on an outcome of the security function.

In some implementations, the in-vehicle IoT network may be secured using the device within the in-vehicle IoT network. The in-vehicle IoT network may be a mesh network or a non-mesh network. The device may be an embedded secure element within the in-vehicle IoT network, which may provide security to automotive functions, user identity, user data, and/or various components and modules. The device may provide the security enabled by Federal Information Processing Standards (FIPS) and/or National Institute of Standards and Technology (NIST) algorithm based cryptographic techniques to the in-vehicle IoT network.

In some implementations, the device may be used to provide security functions for authentication and verification of nodes within the in-vehicle IoT network. The device may provide security functions such as authorization and verification of identity. The device may provide the root of trust (or core root of trust) within the in-vehicle IoT network, where the root of trust may be used by an application layer of the vehicle to ensure security of the in-vehicle IoT network. The device may ensure that stored data is secure, functional nodes are safe from malicious configuration changes, functional nodes are safe from malicious firmware changes, and/or interconnected communications are secure. The device may verify whether a given transaction (e.g., replacing a node of the vehicle) is a trusted transaction coming from a trusted source or a trusted originator of a request, and if so, the device may permit the transaction to be performed.

In some implementations, the device may function in conjunction with the host processor to provide the security. After the device is successfully provisioned, the device may establish the root of trust for the host processor. The host processor may use the device for identify verification, authentication, authorization, or other security functions.

In some implementations, for complex in-vehicle IoT networks, a teamed device approach (e.g., a teamed TA approach) may be implemented in which multiple devices may be employed. In this case, security for the in-vehicle IoT network may not be entrusted to a single device, but rather to the multiple devices. Each device may include an embedded hardware security module, which may store information that enables the device to perform security functions for nodes associated with that device and for nodes associated with other devices. The multiple devices may work in tandem with the host processor to provide security for the in-vehicle IoT network. In some implementations, different devices may be associated with different groups of nodes, which may allow complex vehicle functions to be isolated for better protection and management. For example, a first device may be associated with a first set of nodes responsible for navigation, whereas a second device may be associated with a first set of nodes responsible for safety. In some implementations, the multiple devices may be useful for handling device failure and triggering a failover. When one device fails, another device in the in-vehicle IoT network may perform security functions for the failed device, which may occur until the failed device is repaired. As a result, security for the in-vehicle IoT network may not be dependent on a single device and instead may be spread across the multiple devices, thereby improving an overall security for the in-vehicle IoT network.

In some implementations, the device (or multiple devices) may provide various security benefits for the in-vehicle IoT network. The device may protect the user identity from remote snooping. The device may protect a modification to in-memory or in-store data in the vehicle that is used for security functions of the vehicle. The device may provide hardware attack detection and may perform various security measures, such as destroying sensitive data. The device may protect vehicle control elements from tampering. The device may prevent wireless hacking of the in-vehicle IoT network for malicious alteration of the sensors and components. The device may prevent wireless hacking from inside the vehicle by a passenger riding in the vehicle. The device may prevent man-in-the-middle (MITM) attacks within the in-vehicle IoT network.

FIG. 1 is a diagram illustrating an example 100 of an in-vehicle IoT network 105 that includes a device 110 with a memory 115 having an embedded hardware security module. As shown, the memory 115 may store information 120, the device 110 may include a memory controller 125, the in-vehicle IoT network may include a host processor 130 (e.g., a vehicle host processor) and/or one or more nodes 135, and the host processor 130 may communicate with an external system 140.

In some implementations, the device 110 (e.g., a TA), the host processor 130, and the one or more nodes 135 may be included in the in-vehicle IoT network 105. The device 110 may include the memory 115 with the embedded hardware security module. The memory 115 may store information 120 associated with the in-vehicle IoT network 105. For example, the information 120 may be associated with a node 135 of the in-vehicle IoT network 105, and/or the information 120 may be associated with a user of a vehicle associated with the in-vehicle IoT network 105. The device 110 may include a memory controller 125 to store the information 120 (or write information) in the memory 115 and to access the information 120 (or read information) from the memory 115. The device 110 with the memory 115 having the embedded hardware security module may communicate with the host processor 130 to perform security functions for the in-vehicle IoT network 105, which may protect the in-vehicle IoT network 105 from attacks, as described in further detail herein. For example, a security function may include node verification, as further described with respect to FIG. 2, or user authorization, as further described with respect to FIG. 3. The host processor 130 may communicate with an external system 140 outside of the in-vehicle IoT network 105.

In some implementations, a node 135 may be a dumb node capable of performing a function. For example, the dumb node may perform a function related to taking a measurement (e.g., using a sensor). The dumb node may not automatically signal an output of the function, but rather may be instructed to signal the output of the function. The dumb node may be controlled and monitored by the host processor 130.

In some implementations, a node 135 may be an intelligent node having a computation and decision-making capability. In some implementations, an intelligent node may automatically perform an action (e.g., controlling a vehicle component and/or signaling information to another node) based on sensed information, whereas a dumb node may not automatically perform an action (e.g., without receiving a request for the action to be performed). For example, the intelligent node may have a capability of processing camera information and detecting objects, where an output may be transmittable to another node of the vehicle (e.g., an onboard computer). As another example, the intelligent node may have a capability of detecting a temperature inside of the vehicle and turning on a heating component of the vehicle.

In some implementations, a node 135 may be a sensor node capable of reporting sensor data on-demand or in accordance with a defined periodicity. The sensor node may report sensor data to another entity of the in-vehicle IoT network, such as the host processor 130 or a control node. As an example, the sensor node may be an image sensor, a temperature sensor, a tire pressure sensor, a proximity sensor, or the like, where each sensor node may be associated with a subsystem of the vehicle (e.g., a lane assist subsystem and/or a parking subsystem).

In some implementations, a node 135 may be a control node capable of controlling the dumb node, the intelligent node, and/or the sensor node. For example, the control node may have a capability of activating or deactivating a set of sensors based on a condition being satisfied. The control node may report information regarding the dumb node, the intelligent node, and/or the sensor node to the host processor 130.

In some implementations, the in-vehicle IoT network 105 may include any number of each type of node 135 (e.g., dumb node, intelligent node, sensor node, and/or control node), and may include multiple types of nodes 135. In some implementations, groups of nodes 135 may be associated with different subsystems of the vehicle. For example, a climate control subsystem of the vehicle may be associated with a first set of nodes, an autonomous driving subsystem of the vehicle may be associated with a second set of nodes, and so on.

In some implementations, the device 110 may be provisioned in the vehicle, during which the device 110 may be established as a root of trust within the in-vehicle IoT network 105. During the provisioning, which may occur at a secure premises of a manufacturer, the manufacturer may provide a file (e.g., a configuration file or an executable file) that is read by the device 110. The file may configure the device 110 to serve as the root of trust within the in-vehicle IoT network 105. The file may configure the device to provide a hardware-based security capability within memory, such as the embedded hardware security module of the memory 115. The file may configure the device 110 to integrate true hardware-based roots of trust into the memory 115 (e.g., flash memory), which may enable strong cryptographic identity and health management for IoT devices of the vehicle. The file may configure the device 110 to move security primitives in-memory, which may help to protect the integrity of code and data housed within the memory 115.

In some implementations, a vehicle operating system that runs on the host processor 130 may recognize the device 110 and provide a registration configuration to the device 110 during the initial provisioning of the device 110. The registration configuration may enable the device 110 to register with the host processor 130. The registration configuration may enable the device 110 to perform security functions related to the security of the in-vehicle IoT network 105. The registration configuration may indicate the information 120 regarding the node 135 of the in-vehicle IoT network 105. For example, the information 120 may indicate cryptographically protected node information (e.g., node signatures). The device 110 may store the information 120 in the memory 115, and the device 110 may subsequently use the information 120 when performing the security functions for the in-vehicle IoT network 105.

In some implementations, after the device 110 is provisioned in the in-vehicle IoT network 105, the device 110 may be established as the root of trust for the host processor 130 based on the file loaded onto the device 110 during the provisioning. As a result, the host processor 130 may use the device 110 for identity verification and authentication purposes. The device 110 may provide security functions in a secure manner for the in-vehicle IoT network 105. In some implementations, the device 110 may be protected from tampering using an in-built tamper detection component (e.g., tamper detection electronic circuitry). The tamper detection component may establish a tamper protection perimeter, which may be a hardware implementation used for detecting a breach of the device 110.

In some implementations, the host processor 130 may be directly accessible to the device 110. Communications between the host processor 130 and the device 110 may be based on a public key infrastructure framework. The host processor 130 may run a secure real-time operating system and may have drivers that are capable of communicating with the device 110 in a secure fashion. Interactions between the host processor 130 and the device 110 may follow the public key infrastructure framework. In some implementations, nodes 135 may not be accessible to the device 110. In other words, nodes 135 may not communicate with the device 110, but rather may communicate with the host processor 130. As a result, the device 110 in the in-vehicle IoT network 105 may only be accessible to the host processor 130, thereby improving security.

In some implementations, the device 110 may store the information 120 in the memory 115 based on an authenticated write command from the host processor 130. For example, the device 110 may receive node information from the host processor 130, and the device 110 may store the node information in the memory 115 based on the authenticated write command from the host processor 130. In some implementations, the device 110 may retrieve the information 120 in the memory 115 based on an authenticated read command from the host processor 130. For example, the device 110 may retrieve user data from the memory 115 based on the authenticated read command from the host processor 130, and the device 110 may indicate the user data to the host processor 130. In other words, the host processor 130 may store/retrieve sensitive data in the memory 115 with the embedded hardware security module using authenticated write/read commands.

In some implementations, the device 110 may store a security key in the memory 115. The device 110 may store the security key for the host processor 130. The security key may enable secure communications between the host processor 130 and the external system 140. The external system 140 may be a remote end point, such as a server that provides configuration updates to the vehicle. For example, the host processor 130 may retrieve the security key from the device 110 prior to performing the secure communications with the external system 140. The security key may be stored at the device 110 and may not be maintained by the host processor 130 for increased security. In other words, the device 110 may be used by the host processor 130 as a key store for the secure communications between the host processor 130 and the external system 140.

In some implementations, the device 110 may provide, in addition to in-vehicle security, security functions in other domains. For example, the device 110 may communicate with the host processor 130 to provide security for in-vehicle telemetry services, access to external data networks, and/or over-the-air downloads and updates. For example, over-the-air downloads may require user authorization, which may be performed using the device 110 based on the information 120 stored in the memory 115.

In some implementations, the device 110 may be implemented using an Automotive Open System Architecture (AUTOSAR) platform, which may be used to create and establish an open and standardized software architecture for automotive electronic control units (ECUs). The device 110 may be implemented using an AUTOSAR classic platform, which may have three software layers that run on a microcontroller, which may include an application, a runtime environment, and basic software. The device 110 may be implemented using an AUTOSAR adaptive platform, which may include three layers associated with a user application, an operating system interface, and a virtual machine or container or hardware. The user application layer may be receptive to various security application installations. The device 110 may be implemented by using functional application programming interfaces (APIs).

In some implementations, secure communications between the node 135 and an ECU may be based on elliptic curve cryptography. When the embedded hardware security module is delivered to the device 110 for deployment in the vehicle, the embedded hardware security module may have a private key that is derived from a physical unclonable function (PUF) static random-access memory (SRAM). After the initial provisioning, the device 110 may store a root key in the memory 115, and at this point, the memory 115 may be used by the device 110. The memory 115 may be secure memory based on the embedded hardware security module.

In some implementations, during the provisioning, sensitive data such as user data, unique device identifier (UDI), and/or unique node identifier (UNI) may be wrapped using a cryptographic function, such as secure hash algorithm 256 (SHA256), where a resulting hash of the cryptographic function may be stored in the memory 115 as a golden measurement. During a check of the vehicle, the host processor 130 may request the device 110 to verify the sensitive data. A measurement of sensitive data stored in the memory 115 may be performed using cryptographic functions, where an output of the measurement may be compared to the golden measurement. Based on the comparison, the sensitive data may be verified.

In some implementations, the host processor 130 may be associated with multiple devices. For example, a dedicated lower density device may be used to store secure data of the in-vehicle IoT network 105, such as security keys, UDIs, and so on. A device with another density level may be used to store user data. In some implementations, sensitive data stored in the device 110 may be physically separated from other storage systems of the vehicle, such that secure communications with encryption may be performed without compromising an overall system latency.

As indicated above, FIG. 1 is provided as an example. Other examples may differ from what is described with regard to FIG. 1.

Figure 2:
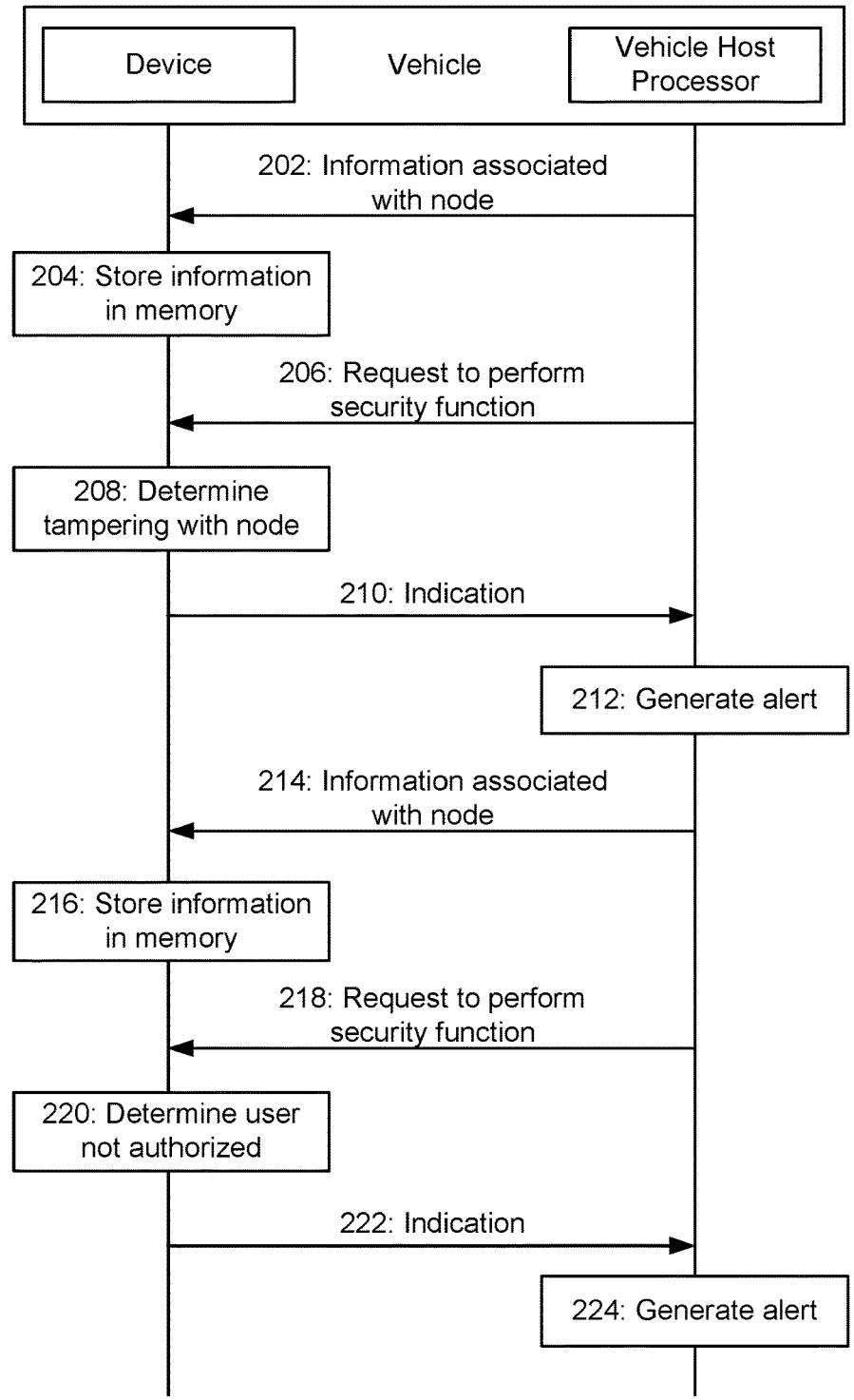
FIG. 2 is a diagram illustrating an example of node verification and user authorization using a device with an embedded hardware security module.

FIG. 2 is a diagram illustrating an example 200 of node verification and user authorization using a device with an embedded hardware security module. The node verification and the user authorization may be performed using a device (e.g., device 110) with memory (e.g., memory 115) having an embedded hardware security module, a memory controller 125, a node (e.g., node 135), and a host processor (e.g., vehicle host processor 130). The device, the node, and the host processor may be associated with an in-vehicle IoT network (e.g., in-vehicle IoT network 105) of a vehicle, as described above in connection with FIG. 1.

As shown by reference number 202, the device may receive information (e.g., information 120) associated with the node from the host processor. The device may receive the information associated with the node, as part of the registration configuration, during an initial provisioning of the device. The information may indicate a true node identity associated with the node. The true node identity may be associated with a unique device identification. The unique device identification may be based on a maker code associated with the node, a model code associated with the node, and/or a serial number associated with the node. The maker code may correspond to a maker or manufacturer of the node. The model code may correspond to a model number of the node. The unique device identification may also be referred to as a UDI or a UNI.

As shown by reference number 204, the device may store the true node identity in the memory having the embedded hardware security module. The device may store the true node identity in the memory using the memory controller of the device. The device may serve as a root of trust for the host processor using the information stored in the memory.

As shown by reference number 206, the device may receive, from the host processor, a request to perform a security function, where the security function may be associated with the node verification. The device may receive the request to perform the node verification in a periodic manner (e.g., once a day) or in an aperiodic manner (e.g., when the vehicle is started). The node verification may be for the purpose of detecting whether a given node in the in-vehicle IoT network has been tampered with (e.g., replaced with another node without proper authorization). The request may indicate a candidate node identity associated with the node. The candidate node identity may reflect a node identity of a node that is currently in the in-vehicle IoT network. The device may perform, based on the request, the security function of the node verification using the information stored in the memory of the device.

As shown by reference number 208, the device may determine, during the node verification, that a tampering with the node has occurred based on a comparison of the true node identity, as stored in the memory, with the candidate node identity indicated in the request. The device, when performing the security function, may compare the candidate node identity against the true node identity. For example, the candidate node identity may indicate that the node that is currently in the in-vehicle IoT network is not an original node of the in-vehicle IoT network, which may imply that the original node was tampered with. For example, the original node associated with the true node identity may have been improperly replaced with a new node associated with the candidate node identity. As a result, when any node in the in-vehicle IoT network is tampered with, an identity check with the device may fail.

As shown by reference number 210, the device may send, to the host processor, an indication of the node tampering. The indication may indicate a particular node associated with the tampering. The indication may indicate a type of tampering, such as installing a new node in the vehicle without permission.

As shown by reference number 212, the host processor may generate an alert (e.g., a security breach flag) to indicate the tampering with the node. The host processor may generate an output (e.g., an indication on a display screen or an audio alert) indicating the node associated with the tampering. Alternatively, the host processor may generate an alert to indicate that the node is legitimate, which may be based on the candidate node identity corresponding with (e.g., matching) the true node identity.

In some implementations, the host processor may retrieve the true node identity from the device, and the host processor may compare the true node identity with the candidate node identity. Based on the comparison of the true node identity and the candidate node identity, the host processor may determine whether the node has been tampered with. The comparison may be performed at the host processor instead of at the device. In some implementations, the host processor may perform a periodic autonomous check of a network topology associated with the in-vehicle IoT network, where the periodic autonomous check may be for a node verification or a tamper detection of the node of the in-vehicle IoT network. The host processor may perform the periodic autonomous check for all nodes of the network topology, or the host processor may perform the periodic autonomous check for a subset of nodes of the network topology. The subset of nodes may correspond to nodes having a higher importance relative to other nodes of the network topology.

In some implementations, a UDI may be used by the host processor to uniquely identify different nodes of the in-vehicle IoT network, where the UDI may be constructed using the maker code, the model code, and the serial number. The maker code, the model code, and the serial number may be wrapped in a cryptographic manner to create a unique hash of a device identification, which may produce the UDI. The UDI may be stored within the secure memory of the device. The host processor may maintain a database of nodes and associated UDI references, but not actual UDIs, which may not leave the secure memory of the device. When a specific node is discovered in a topology based on a node discovery or programmed after replacing a previous node, the host processor may send data associated with the node to the device, where the data may include the maker code, the model code, and the serial number. The device may create the UDI for the node and indicate a reference of the UDI for the node (e.g., not the actual UDI) to the host processor. The host processor may store the reference for the node in the database, and the host processor may compare the reference for the node to the candidate node identity when determining whether the node has been tampered with. In other words, the device may store a unique device identification (e.g., UDI) for the node in the memory of the device, and the device may provide, to the host processor, the reference associated with the unique device identification for storage at the host processor and for node identification.

As an example, a component (e.g., a steering component or a braking component) of the vehicle may be tampered with, such that the component may be remotely controlled by an external device, which may pose a safety issue for the vehicle. The component may be replaced with a substitute component with different settings during the tampering. During a vehicle self-check, the device and/or the host processor may determine that the component has been tampered with based on a unique device identification associated with the substitute component (or a lack of a device identification associated with the substitute component), which may be different than a UDI associated with the original component. The host processor may generate an output indicating, to a user of the vehicle, that the component has been tampered with.

As shown by reference number 214, the device may receive information (e.g., information 120) associated with a user of the vehicle, where the information may be user data. The device may receive the user data after an initial provisioning of the device. The user data may indicate a true user credential associated with the user of the vehicle. The true user credential may be based on user biometric information and/or user contact information. The biometric information may be based on, for example, a voice recognition, fingerprint scanning, facial recognition, and/or iris recognition. The user contact information may include a user phone number or another type of identification number.

As shown by reference number 216, the device may store the true user credential in the memory having the embedded hardware security module. The device may store the true user credential in the memory using the memory controller of the device. The device may serve as a root of trust for the host processor using the information stored in the memory. The device may store the true user credential within the memory having the embedded hardware security module, which may protect the true user credential against attacks, such as a network intrusion attack. The device may store user sensitive data and/or unencrypted user data within the memory having the embedded hardware security module.

As shown by reference number 218, the device may receive, from the host processor, a request to perform a security function, where the security function may be associated with the user authorization for the user of the vehicle. The user authorization may be a prerequisite to making changes to the node of the in-vehicle IoT network, which may involve modifying the node of the in-vehicle IoT network, replacing the node of the in-vehicle IoT network (e.g., due to a hardware malfunction), or adding a new node to the in-vehicle IoT network, among other examples. Modifications to the node may involve adjusting a parameter associated with the node, changing a configuration associated with the node, and/or changing firmware associated with the node. The request may indicate a candidate user credential associated with the user. The candidate user credential may be associated with a user for which the user authorization is being performed. The device may perform, based on the request, the security function of the user authorization using the information stored in the memory of the device.

As shown by reference number 220, the device may determine, during the user authorization, that the user is not authorized, based on a comparison of the true user credential, as stored in the memory, with the candidate user credential indicated in the request. The device may, when performing the security function, compare the candidate user credential to the true user credential. For example, the candidate user credential of the user may correspond to a user that is not authorized to make changes to the node of the in-vehicle IoT network.

As shown by reference number 222, the device may send, to the host processor, an indication that the user is not authorized. The indication may indicate a reason for which the user is not authorized (e.g., fingerprints of the user do not match stored fingerprints, or a face of a user attempting to perform a node modification does not match a stored image of the user's face).

As shown by reference number 224, the host processor may generate an alert to indicate that the user is not authorized. The host processor may generate an output (e.g., an indication on a display screen or an audio alert) indicating that the user is not authorized to make changes to the node of the in-vehicle IoT network. Alternatively, the host processor may generate an alert to indicate that the user is authorized, which may be based on the candidate user credential corresponding to the true user credential.

As an example, a fuel pump regulator of the vehicle may be configurable based on a driving style. Settings of the fuel pump regulator may be throttled for fuel efficiency, depending on a sport setting or daily use setting. The settings may be changeable and programmable, and a configuration of the settings (e.g., different parameters) should be protected. The device may ensure that the settings of the fuel pump regulator should only be configured by authorized persons. The device may verify user credentials of a user that is authorizing a configuration update for the fuel pump regulator to ensure that the settings of the fuel pump regulator are not improperly set.

As another example, a response timing of an automatic braking system (ABS) may be changed via hacking, where such changes may be life threatening. A malicious entity may attempt to delay a response timing of air bag sensors. The device may provide security to ensure that such changes are not implemented by unauthorized users.

In some implementations, the host processor may retrieve the true user credential from the device, and the host processor may compare the true user credential with the candidate user credential. Based on the comparison of the true user credential and the candidate user credential, the host processor may determine whether the user is authorized to make changes to the node of the in-vehicle IoT network. The comparison may be performed at the host processor instead of at the device.

In some implementations, the user data, such as the true user credential, may be stored in the memory with the embedded hardware security module. The device may access the user data when the user of the vehicle is to authorize a replacement of parts (e.g., a node replacement), a service of the vehicle (e.g., a node repair), and/or a configuration change (e.g., a node modification). The device may verify the candidate user credential against the true user credential stored at the device. The device may perform user authorization only to the host processor. In some cases, inserting a new node or a replacement node may require the user authorization.

In some implementations, a unique device identification associated with the new node or the replacement node may be stored in the memory of the device. In other words, the unique device identification of the new node or the replacement node may be programmed into the memory of the device. In the case of the new node, the unique device identification may subsequently be used for node verification. In the case of the replacement node, the unique device identification may replace an earlier unique device identification of a node that is being replaced, and the unique device identification may subsequently be used for node verification. The earlier unique device identification may be erased from the memory of the device.

In some implementations, the user associated with the vehicle may change (e.g., a new user may purchase the vehicle from an existing user). A new true user credential may be programmed into the memory of the device, and an earlier true user credential may be erased from the memory of the device, subject to a verification/authorization initiated by an initial user of the vehicle. The new true user credential may be used for subsequent user authorizations.

As indicated above, FIG. 2 is provided as an example. Other examples may differ from what is described with regard to FIG. 2.

Figure 3:
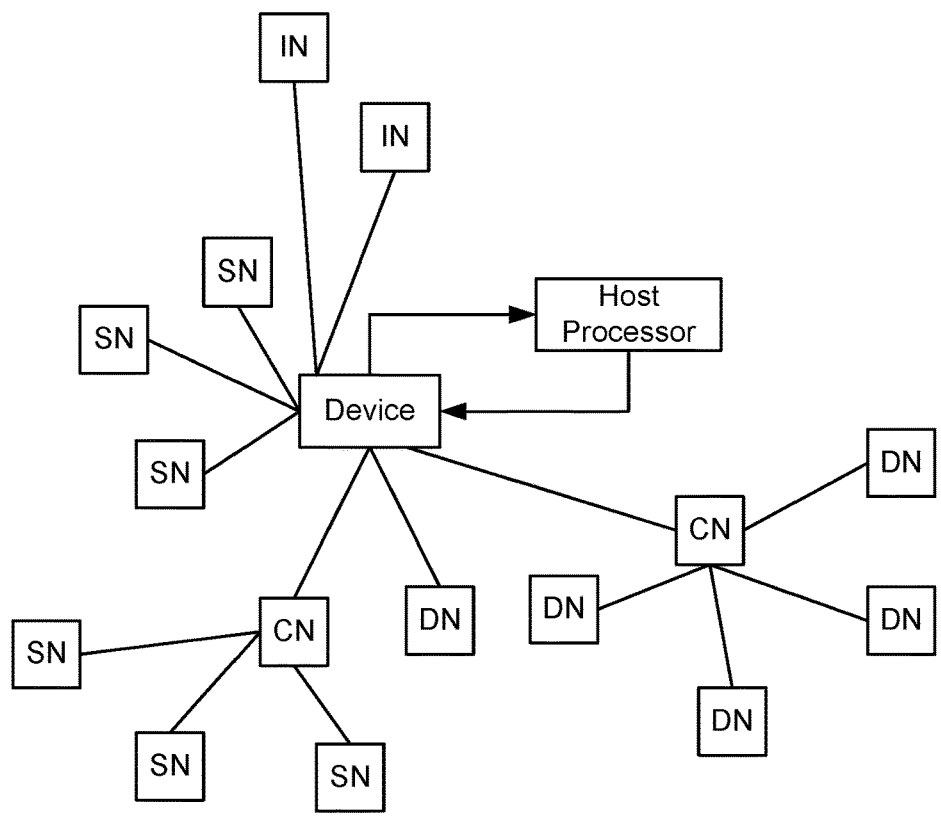
FIG. 3 is a diagram illustrating an example network topology that includes a host processor, a device with an embedded hardware security module, and a plurality of nodes.

FIG. 3 is a diagram illustrating an example 300 of a network topology that includes a host processor (e.g., a vehicle host processor), a device with an embedded hardware security module, and a plurality of nodes.

As shown in FIG. 3, a device (e.g., a TA) may perform security functions for a host processor in an in-vehicle IoT network. The in-vehicle IoT network may be associated with a vehicle, and the in-vehicle IoT network may include a plurality of nodes of the vehicle. The host processor may communicate with the nodes of the vehicle, which may include dumb nodes (DNs), intelligent nodes (INs), sensor nodes (SNs), and/or control nodes (CNs). Each node may be associated with a UDI. In some cases, certain types of nodes (e.g., dumb nodes) may not be associated with a UDI.

In some implementations, the device may only be accessible to the host processor. In other words, the device may only communicate with the host processor, and the device may not transmit or receive information from the nodes of the vehicle. As a result, information stored in a memory of the device (e.g., an embedded hardware security module of the device) may be accessible to the host processor but may not be accessible to the nodes of the vehicle, which may improve security.

As indicated above, FIG. 3 is provided as an example. Other examples may differ from what is described with regard to FIG. 3.

Figure 4:
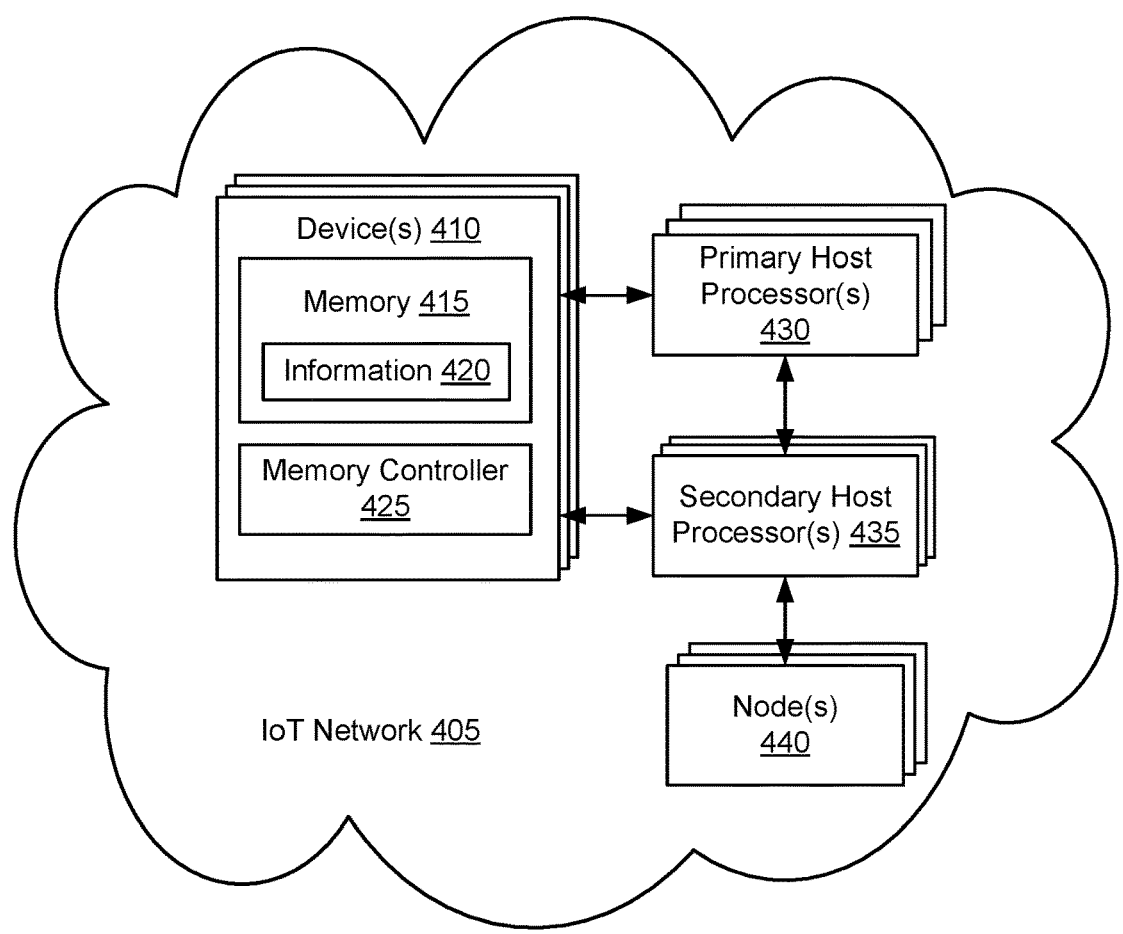
FIG. 4 is a diagram illustrating an example of an IoT network that includes multiple devices with memories having embedded hardware security modules.

FIG. 4 is a diagram illustrating an example 400 of an IoT network 405 that includes multiple devices 410, each with memories 415 having embedded hardware security modules. As shown, a memory 415 may store information 420, and a device 410 may include a memory controller 425. The IoT network 405 may include one or more primary host processors 430, one or more secondary host processors 435, and/or one or more nodes 440. The devices 410 including memory 415, the primary host processor 430 and the secondary host processors 435, and the nodes 440 may correspond to device 110 including memory 115, host processor 130, and nodes 135, respectively, as described in connection with FIG. 1.

In some implementations, the IoT network 405 may be an in-vehicle IoT network (e.g., similar to in-vehicle IoT network 105). The devices 410, the primary host processor 430, the secondary host processors 435, and/or the nodes 440 may be associated with a single vehicle. For example, the single vehicle may include the primary host processor 430 and multiple devices 410, where each device 410 may be associated with a secondary host processor 435 and a set of nodes 440.

In some implementations, the IoT network 405 may span across multiple vehicles. The devices 410, the primary host processors 430, the secondary host processors 435, and/or the nodes 440 may span across the multiple vehicles. For example, a first vehicle may include a primary host processor 430 and multiple devices 410, where each device 410 may be associated with a secondary host processor 435 and a set of nodes 440. A second vehicle may include a primary host processor 430 and multiple devices 410, where each device 410 may be associated with a secondary host processor 435 and a set of nodes 440. The primary host processor 430, the multiple devices 410, the secondary host processor 435, and the set of nodes 440 may be different between the first vehicle and the second vehicle. The first vehicle and the second vehicle may be able to communicate via primary host processors of the respective vehicles.

In some implementations, the devices 410 may communicate with each other, when the devices 410 are associated with the in-vehicle IoT network 405 or when the devices 410 are associated with the IoT network 405 that spans across the multiple vehicles. The devices 410 may directly communicate with each other via a secure channel. Additionally, or alternatively, the devices 410 may communicate with each other via primary host processors 430, which may improve security for communications between the devices 410. The devices 410 may exchange information between each other (e.g., directly or via the primary host processors 430), such as node information and/or user information, which may enable the devices 410 to perform security functions for other devices 410, such as when one of the devices 410 becomes associated with a failure, as described in additional detail below in connection with FIGS. 5-8.

As indicated above, FIG. 4 is provided as an example. Other examples may differ from what is described with regard to FIG. 4.

Figure 5:
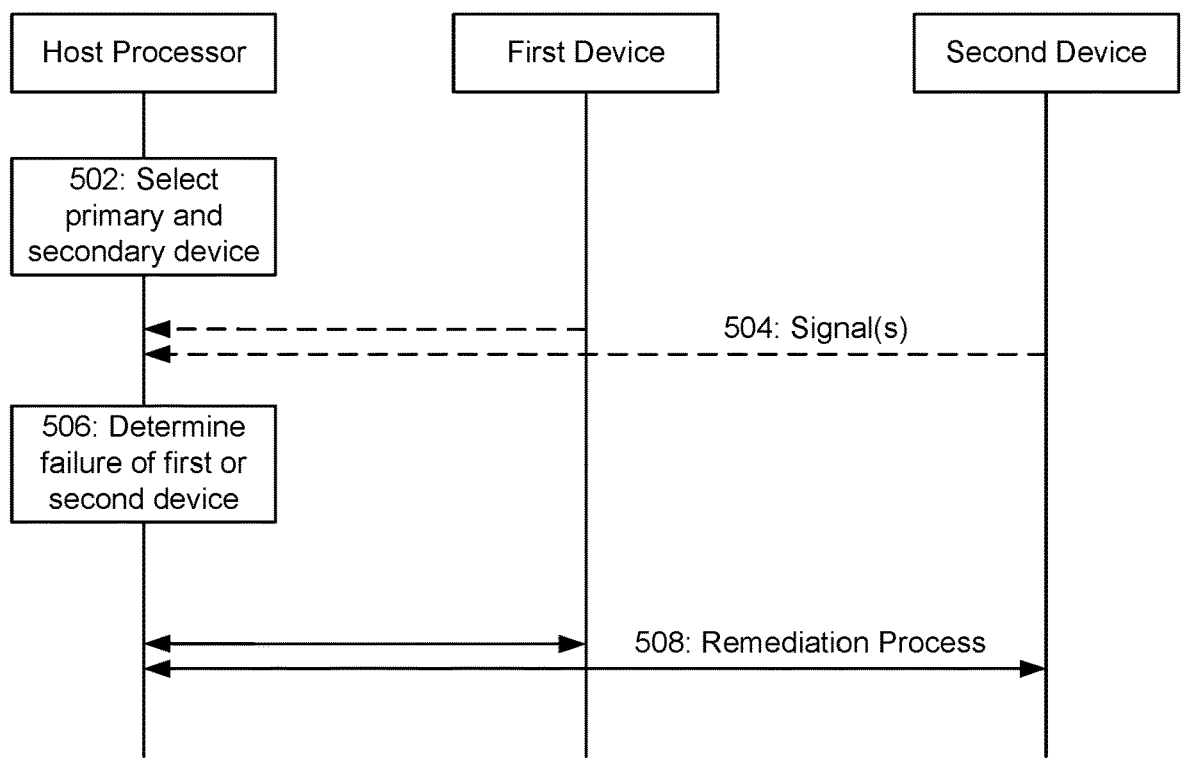
FIG. 5 is a diagram illustrating an example of performing a remediation process based on a device failure.

FIG. 5 is a diagram illustrating an example 500 of performing a remediation process based on a device failure. The remediation process may be performed using a host processor (e.g., host processor 130 or primary host processor 430), a first device (e.g., device 110 or device 410), and a second device (e.g., device 110 or device 410). The host processor, the first device, and the second device may be associated with a vehicle. For example, the host processor may be a vehicle host processor. The host processor, the first device, and the second device may be associated with an IoT network, such as in-vehicle IoT network 105, as described above in connection with FIG. 1.

In some implementations, the first device may include a first memory with an embedded hardware security module. The first device may be associated with a first set of nodes of the vehicle. The second device may include a second memory with an embedded hardware security module. The second device may be associated with a second set of nodes of the vehicle. In some implementations, the first memory and the second memory may store information that enables security functions to be performed by the first device and the second device, in conjunction with the host processor. The first memory and the second memory may serve as a root of trust for the host processor.

As shown by reference number 502, the host processor may select, from a plurality of devices including the first device and the second device, the first device to serve as a primary device and the second device to serve as a secondary device. The second device, when serving as the secondary device, may be designated as a failover device in case the first device fails, so that the second device may handle security functions of the first device. The host processor may select the first device and the second device during an arbitration process, which may occur after an initial startup and registration of the first device and the second device with the host processor. The host processor may transmit indications to the first device and the second device indicating an assignment of the primary device and the secondary device, respectively. The first device, when acting as the primary device based on the indication received from the host processor, may be capable of performing a first set of functions. The second device, when acting as the secondary device based on the indication received from the host processor, may be capable of performing a second set of functions, where the second set of functions may be a subset of the first set of functions. In other words, the first device may have additional functionalities as compared to the second device. For example, the first device, when acting as the primary device, may be able to repair the second device based on the additional functionalities associated with the first device, whereas the second device, when acting as the secondary device, may be unable to repair the first device.

In some implementations, the plurality of devices may not have a primary-secondary designation. Rather, the plurality of devices may each share a same set of functionalities. For example, each device may be capable of repairing another device based on the set of functionalities associated with the device.

In some implementations, the host processor may select the first device and the second device to serve as the primary device and the secondary device, respectively, using various mechanisms. In one example, the host processor may determine that the first device registered with the host processor before the second device registered with the host processor, so the host processor may assign the first device to be the primary device and the second device to be the secondary device. In another example, the host processor may determine an assignment of the primary device and the secondary device in accordance with a round-robin scheme or based on another type of scheduling. In yet another example, the host processor may determine the assignment of the primary device and the secondary device based on a device capability. For example, the second device may not be capable (e.g., from a hardware and/or software perspective) of serving as the primary device, so the host processor may select the first device to be the primary device and the second device to be the secondary device.

In some implementations, the first memory may store first information, which may enable the first device to perform security functions for the first set of nodes. The first information may include node information and/or user information associated with the first set of nodes. The first memory may store second information, which may enable the first device to perform security functions for the second set of nodes. The second information may include node information and/or user information associated with the second set of nodes. Since the first device may serve as the primary device, the first device may store, in the first memory, both the first information and the second information, such that the first device may be capable of performing security functions for both the first set of nodes and the second set of nodes. The second memory may store the second information, which may enable the second device to perform security functions for the second set of nodes. Since the second device may serve as the secondary device, the second device may not store the first information, and as a default setting, the second device may not be capable of performing security functions for the first set of nodes.

In some implementations, the plurality of devices may store information (e.g., metadata of security data) of other devices of the plurality of devices. After an initial startup and an arbitration (or selection) of the first device to serve as the primary device and the second device to serve as the secondary device, the host processor may program the first information of the first device into the second device. The first device, which may be the primary device, may store information (e.g., a superset of data) of other devices of the plurality of devices, irrespective of whether the other devices are primary devices or secondary devices, which may be useful for failover redundancy.

In some implementations, the host processor may periodically (e.g., once per day) reset the selection of the primary device and the secondary device. For a particular device, whether that device is assigned to be the primary device or the secondary device may depend on an assignment history of the device. For example, when the device has served as the primary device for one or two days in a row, and other devices are available to serve as the primary device, the device may not be selected to be the primary device and instead may be selected to be the secondary device.

In some implementations, during the selection of the primary device and the secondary device, the host processor may identify the first device, the second device, and a third device. The host processor may determine that the third device is associated with a failure, which may be based on a signal received from the third device. The host processor may exclude the third device as a candidate for serving as the primary device when selecting the first device to serve as the primary device. In other words, since the third device may be associated with the failure, the third device may be unable to serve as the primary device, and the host processor may not select the third device during an arbitration process.

As shown by reference number 504, the host processor may receive a signal from the first device or the second device, where the signal may indicate that the first device or the second device is associated with a failure. The signal may be an error signal, which may indicate that the first device or the second device is associated with an error, which may be indicative of the failure. The error signal may include a code that indicates a nature of the error. For example, the code may indicate a hardware error, a software error, or another type of error. When the host processor receives the signal, the first device or the second device may be turned on, but unable to operate correctly.

In some implementations, the host processor may periodically receive signals from the first device and/or the second device, and when the host processor does not receive a signal for a certain period of time, the lack of signal may be indicative of a failure at the first device and/or the second device. For example, the lack of signal for the certain period of time may indicate that the first device and/or the second device has lost power and/or is unavailable to the host processor, which may be considered to be a failure. When the host processor does not receive the signal, the first device or the second device may be turned off and not operate at all.

As shown by reference number 506, the host processor may determine that the first device or the second device is associated with the failure. The host processor may determine that the first device or the second device is associated with the failure based on the signal received from the first device or the second device. The host processor may determine that the first device or the second device is associated with the failure based on the lack of signal received from the first device or the second device for the certain period of time.

As shown by reference number 508, the host processor may initiate a remediation process based on the failure associated with the first device or the second device. During the remediation process, the host processor may communicate with the first device and/or the second device to remedy the failure. During the remediation process, the host processor may initiate a failover process. For example, the host processor may instruct the device that is not associated with the failure to perform security functions for the device that is associated with the failure. The host processor may instruct the device that is not associated with the failure to perform the security functions in lieu of the device that is associated with the failure, which may occur for a period of time until the failure is resolved.

In some implementations, the host processor may determine that the failure is associated with the second device, which may be the secondary device. The host processor may transmit, to the first device and based on initiating the remediation process, an instruction for the first device to perform security functions for the second set of nodes in lieu of the second device that is associated with the failure. The first device may perform the security functions for the second set of nodes, which may include a node verification and/or a user authorization. The node verification may involve verifying that a node of the vehicle has not been tampered with. The user authorization may involve authorizing a user that attempts to modify the node, replace the node, or insert a new node in the vehicle. In some implementations, the host processor may determine when the second device is no longer associated with the failure. For example, the host processor may receive a second signal from the second device, where the second signal may indicate that no error is associated with the second device. As another example, the host processor may resume receiving periodic signals from the second device, after an interruption to the receipt of periodic signals, which may indicate that the second device is no longer associated with the failure. The host processor may transmit, to the first device, an instruction for the first device to no longer perform security functions for the second set of nodes. At this point, the first device may only perform security functions for the first set of nodes, and the second device may only perform security functions for the second set of nodes.

In some implementations, the host processor may determine that the failure is associated with the second device, which may be the secondary device. The host processor may determine a nature of the failure, such as whether the failure is not caused by an attack (e.g., a benign failure) or the failure is caused by an attack (e.g., a malignant failure). When the failure is benign, the host processor may instruct the first device to perform security functions for the second device. When the failure is malignant, the host processor may isolate and deactivate the second device, such that the second set of nodes are unable to access the second device. The host processor may transmit a notification to a computing device associated with an authorized service center, where the notification may indicate that the failure of the second device should be resolved.

In some implementations, the host processor may determine that the first device, which may be the primary device, is associated with the failure. The host processor may determine that the first device is associated with the failure based on the signal received from the first device or a lack of signal received from the first device. The host processor may select, based on initiating the remediation process, the second device to serve as the primary device. The second device, which was previously the secondary device, may serve as a new primary device. The host processor may select the second device to serve as the primary device based on an availability of the second device, a round-robin scheme or other scheduling scheme, or a capability of the second device. The host processor may transmit, to the second device, an indication that indicates that the second device is to serve as the primary device. The host processor may provide, for storage in the second memory of the second device, the first information that enables the second device to perform security functions for the first set of nodes. The first information may have been previously stored by the first device but not the second device. The second device, based on the indication and the first information received from the host processor, may be able to perform the security functions for the first set of nodes.

In some implementations, the host processor may determine that the second device, which may be the secondary device, is associated with the failure. The host processor may determine that the second device is associated with the failure based on the signal received from the second device or a lack of signal received from the first device. The second device, which may store the second information which may be used to perform security functions for the second set of nodes, may determine that the second information is corrupted. The second node may transmit, to the host processor, an indication that the second information is corrupted. The host processor, based on the indication received from the second node and based on initiating the remediation process, may reconfigure the second device with the second information. The host processor may run a background service to rebuild the second information based on data retrieved from the first device, which may be the primary device. The host processor may retrieve the second information from the first device, which may store the second information in the first memory, and the host processor may provide the second information to the second device. The second device may repair or replace the corrupted second information using the second information received from the host processor. As a result, the second device may be able to perform security functions for the second set of nodes.

In some implementations, the host processor may determine that the second device, which may be the secondary device, is associated with the failure. The host processor may determine that the first device is not associated with the failure. The host processor may determine that remaining devices, of the plurality of devices, may be associated with failures. The host processor may determine the failures associated with the plurality of devices, including the second device, based on signals or lack of signals received from the plurality of devices. The first device may serve as a solitary primary device. The host processor may generate, based on initiating the remediation process, an alert that indicates that the second device and the remaining devices are associated with failures. The host processor may provide the alert to an output device, such as a display screen, which may notify a driver or passenger of the vehicle of the failures and a need to resolve the failures (e.g., by replacing or repairing devices).

In some implementations, the host processor may determine that the plurality of devices, including the first device and the second device, may be associated with failures based on signals or lack of signals received from the plurality of devices. The host processor may determine that there are no functional devices in the IoT network. The host processor may generate, based on initiating the remediation process, an alert that indicates that the plurality of devices are associated with failures. The host processor may provide the alert to the output device, such as the display screen, which may notify the user or passenger of the vehicle of the failures and a need to resolve the failures (e.g., by replacing or repairing devices).

In some implementations, the host processor may perform a diagnostic of the first device or the second device, which may involve comparing the first device or the second device to a validated device. The validated device may be established in a factory and may not be installed in a customer environment. The host processor may determine, based on comparing the first device or the second device to the validated device, that the first device or the second device is valid. Alternatively, the host processor may determine, based on comparing the first device or the second device to the validated device, that the first device or the second device is invalid, and the host processor may generate an alert indicating that the first device or the second device is invalid.

In some implementations, the host processor may run a diagnostic to determine whether a device, such as the first device or the second device, conforms to predefined operational standards. The host processor may use the validated device (e.g., an already validated device) as a benchmark when verifying diagnostic results. The validated device may be marked as validated after the device successfully undergoes a validation process, which may occur in the factory, during which time the device may be validated against a benchmark device (e.g., a golden device) and marked valid and conforming to the predefined operational standards based on diagnostic runs at manufacturing. The benchmark device may be a device that is hosted in a manufacturing environment and not installed in a customer environment. Device validation and certification may occur during manufacturing, and revalidation and certification may occur at a device provisioning.

In some implementations, the vehicle may be a first vehicle, and the first device and the second device may be associated with the first vehicle. The first device may be configured to communicate with a third device, which may be associated with a second vehicle. The first device and the third device may both be primary devices of the first vehicle and the second vehicle, respectively. The first device and the third device may share information, which may be used for performing security functions at the first vehicle and the second vehicle. The third device may be associated with a third set of nodes of the second vehicle.

As indicated above, FIG. 5 is provided as an example. Other examples may differ from what is described with regard to FIG. 5.

Figure 6:
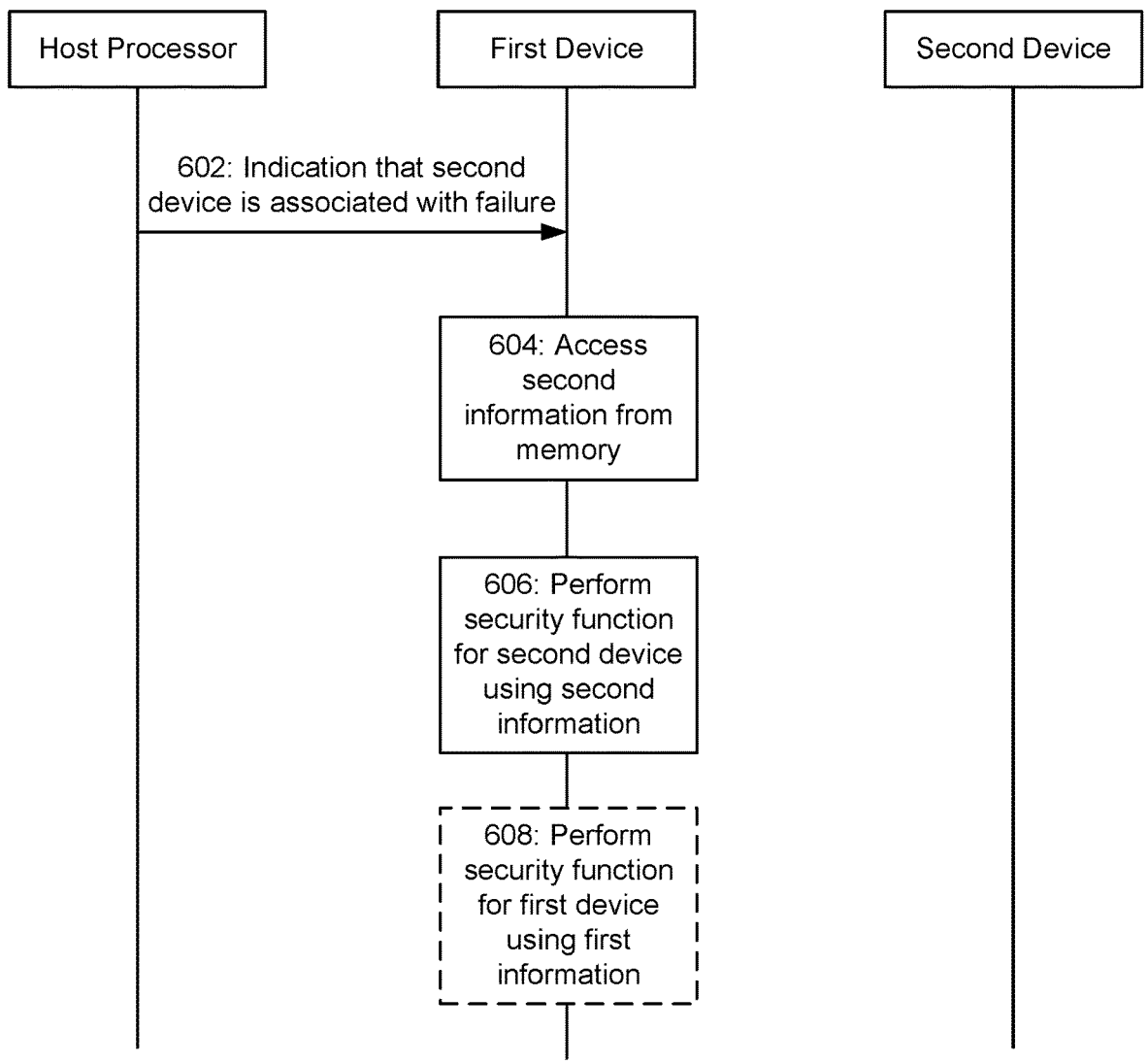
FIG. 6 is a diagram illustrating an example of performing security functions for another device based on a device failure.

FIG. 6 is a diagram illustrating an example 600 of performing security functions for another device based on a device failure. The security functions may be performed using a host processor (e.g., host processor 130 or primary host processor 430), a first device (e.g., device 110 or device 410), and a second device (e.g., device 110 or device 410). The host processor, the first device, and the second device may be associated with a vehicle. The host processor, the first device, and the second device may be associated with an IoT network, such as in-vehicle IoT network 105 or IoT network 405, as described above in connection with FIGS. 1 and 4, respectively.

In some implementations, the first device may include a first memory with an embedded hardware security module, and the first device may be associated with a first set of nodes of the vehicle. The second device may include a second memory with an embedded hardware security module, and the second device may be associated with a second set of nodes of the vehicle. The first memory may store first information and second information, where the first information may be associated with the first set of nodes and the second information may be associated with the second set of nodes. The first information and the second information may include node information and/or user information associated with the first set of nodes or the second set of nodes, respectively.

As shown by reference number 602, the first device may receive, from the host processor, an indication that the second device is associated with a failure. Further, the indication may instruct the first device to perform security functions for the second set of nodes in lieu of the second device. In other words, the host processor may indicate that the second device is unable to perform the security functions for the second set of nodes, and the first device should instead perform the security functions for the second set of nodes.

As shown by reference number 604, the first device may access, from the first memory with the embedded hardware security module, the second information associated with the second device, where the second information may include the node information and/or user information associated with the second set of nodes. The second information stored in the second memory may be replicated in the first memory and may be used by the first device to perform the security functions for the second set of nodes.

As shown by reference number 606, the first device may perform the security function for the second set of nodes, in lieu of the second device that is associated with the failure and in conjunction with the host processor, using the second information associated with the second device. The security functions may include a node verification to verify that a node of the second set of nodes of the vehicle has not been tampered with, or a user authorization of a user that attempts to modify the node or replace the node or insert a new node in the second set of nodes of the vehicle.

In some implementations, the first device may determine, during the node verification, that a tampering with a node of the second set of nodes has occurred based on a comparison of a true node identity, as indicated by the second information associated with the second device, with a candidate node identity. The first device may compare the candidate node identity with the true node identity, and based on the comparison, the first device may detect the tampering with the node of the second set of nodes. The first device may generate an alert indicating the tampering with the node. In some implementations, the first device may determine, during the user authorization, that the user is not authorized based on a comparison of a true user credential, as indicated by the second information associated with the second device, with a candidate user credential. The first device may compare the candidate user credential with the true user credential, and based on the comparison, the first device may detect that the user is not authorized. The host processor may generate an alert indicating that the user is not authorized.

As shown by reference number 608, the first device may perform a security function for the first set of nodes using the first information associated with the first device, where the security function may be associated with a node verification and/or a user authorization associated with the first set of nodes. In other words, the first device may perform security functions for both the first set of nodes and the second set of nodes when the second device is associated with the failure.

As indicated above, FIG. 6 is provided as an example. Other examples may differ from what is described with regard to FIG. 6.

Figure 7:
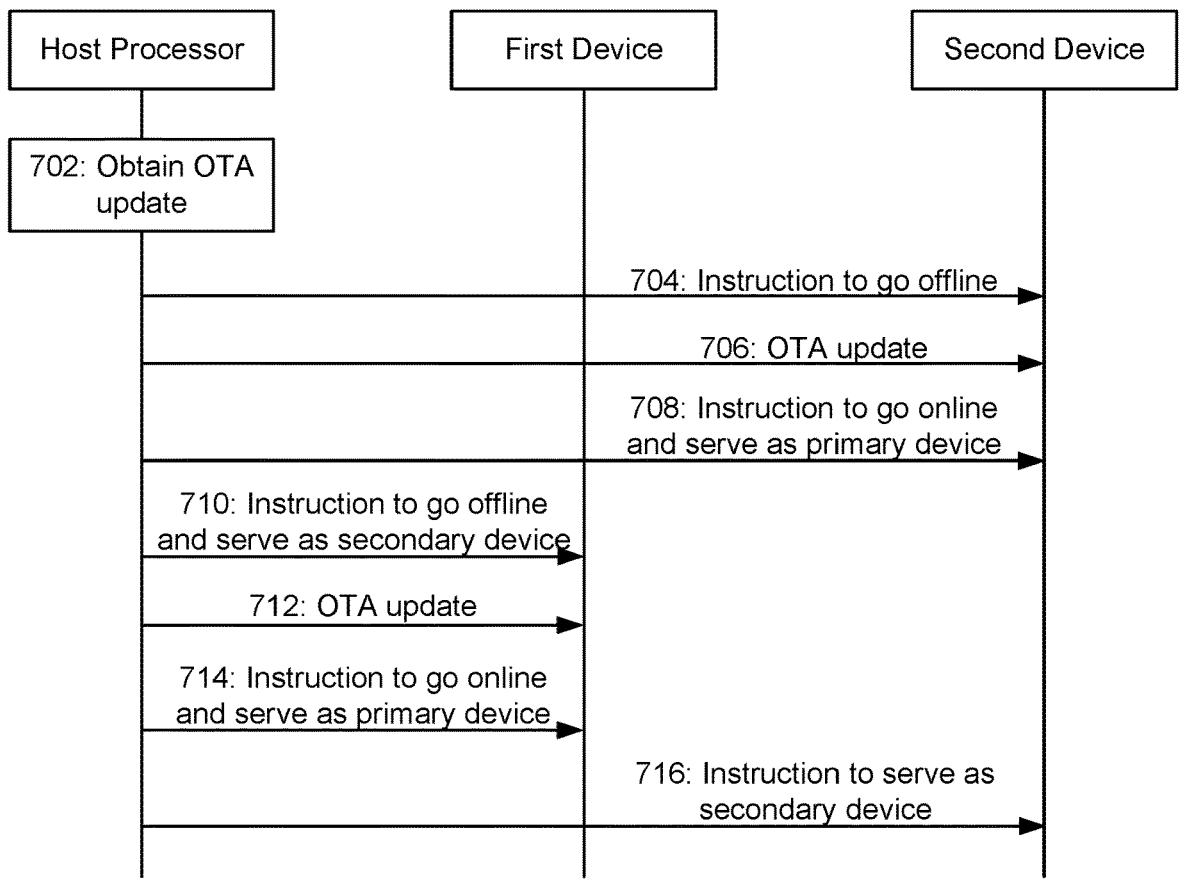
FIG. 7 is a diagram illustrating an example of providing updates to devices.

FIG. 7 is a diagram illustrating an example 700 of providing updates to devices. The updates to the devices may be provided using a host processor (e.g., host processor 130 or primary host processor 430), a first device (e.g., device 110 or device 410), and a second device (e.g., device 110 or device 410). The host processor, the first device, and the second device may be associated with an IoT network, such as in-vehicle IoT network 105 or IoT network 405, as described above in connection with FIGS. 1 and 4, respectively.

In some implementations, the first device may be designated as a primary device and the second device may be designated as a secondary device. In some implementations, the first device may be associated with a first set of nodes and the second device may be associated with a second set of nodes. The first set of nodes and the second set of nodes may include dumb nodes, intelligent nodes, sensor nodes, and/or control nodes.

As shown by reference number 702, during an over-the-air (OTA) update staging, the host processor may obtain an OTA update. The host processor may receive the OTA update from a server. The OTA update may be associated with a firmware or software upgrade. As shown by reference number 704, the host processor may transmit, to the second device, an instruction for the second device to become offline and unavailable to the second set of nodes. The host processor may logically offline the second device and mark the second device as unavailable. As shown by reference number 706, the host processor may provide the OTA update to the second device. The host processor may patch the OTA update to the second device.

In some implementations, the host processor may reset the second device after the OTA update is installed on the second device. The host processor, after a successful completion of the OTA update, may reset the second device. The host processor may run a diagnostic test of the second device (e.g., a newly patched or updated second device) and verify that the second device passes the diagnostic test. The host processor may reset the second device with the OTA update (or new patch) in a fully functional mode.

As shown by reference number 708, the host processor may transmit, to the second device, an instruction for the second device to become online and available to the second set of nodes, where the host processor may transmit the instruction after resetting the second device. The host processor may instruct, via the instruction, the second device to serve as the primary device. As shown by reference number 710, the host processor may transmit, to the first device, an instruction for the first device to become offline and unavailable to the first set of nodes. The host processor may instruct, via the instruction, the first device to serve as the secondary device. In other words, the host processor may make the newly patched second device into the primary device, and the first device into the secondary device. The host processor may initiate an update of the first device, which was previously the primary device and is now the secondary device.

As shown by reference number 712, the host processor may provide the OTA update to the first device. The host processor may reset the first device after the OTA update is installed on the first device. As shown by reference number 714, the host processor may transmit, to the first device, an instruction for the first device to become online and available to the first set of nodes after resetting the first device. The host processor may instruct, via the instruction, the first device to serve as the primary device. As shown by reference number 716, the host processor may transmit, to the second device, an instruction for the second device to serve as the secondary device.

In some implementations, during the OTA updating staging, the host processor may install an OTA update one-by-one on each device of a plurality of devices. The host processor may make a device offline, install the OTA update on the device, and then make the device online. The host processor may repeat this process for each device of the plurality of devices. As a result, each device may be updated when a new OTA update is available, but at least one device may be available at all times to perform security functions for other nodes if needed.

As indicated above, FIG. 7 is provided as an example. Other examples may differ from what is described with regard to FIG. 7.

Figure 8:
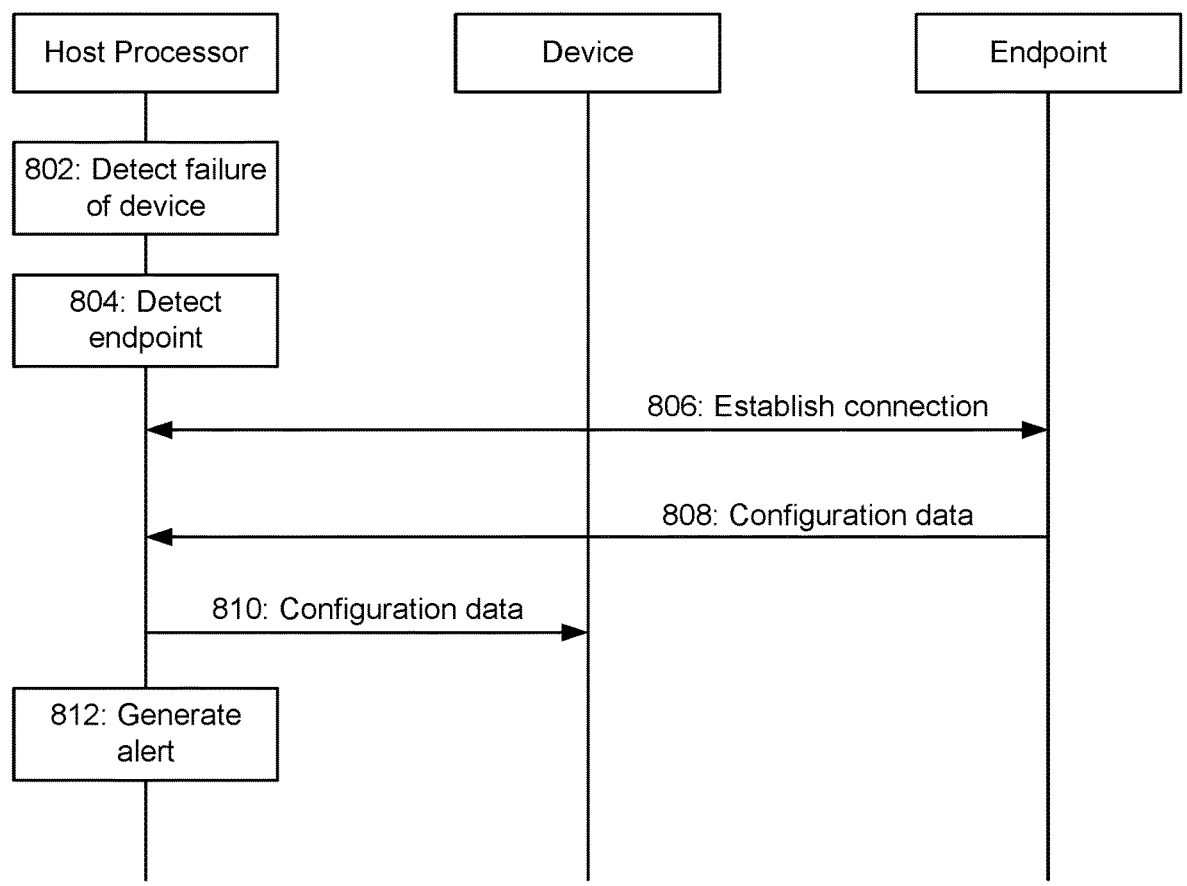
FIG. 8 is a diagram illustrating an example of providing configuration data received from an endpoint.

FIG. 8 is a diagram illustrating an example 800 of providing configuration data received from an endpoint. The configuration data may be provided using a host processor (e.g., host processor 130 or primary host processor 430), a device (e.g., device 110 or device 410), and the endpoint. The host processor and the device may be associated with a first vehicle, and the endpoint may be associated with a second vehicle or an infrastructure. The host processor, the device, and the endpoint may be associated with an IoT network, such as in-vehicle IoT network 105 or IoT network 405, as described above in connection with FIGS. 1 and 4, respectively.

As shown by reference number 802, the host processor may detect a failure associated with the device. The host processor may detect the failure based on a signal received from the device, such as an error message. The error message may indicate a cause associated with the failure. In this case, the first vehicle may be suffering from a system breakdown with respect to a non-functional or corrupted device, and an authorized service center may not be reachable for reliable maintenance and recovery of the device.

As shown by reference number 804, the host processor may detect the endpoint. The host processor may initiate a discovery procedure, and when the host processor and the endpoint are within a certain distance from each other, the host processor may discover the endpoint. During the discovery procedure, the host processor may transmit a discovery signal, and the endpoint may detect the discovery signal and transmit a response based on the discovery signal, which may enable the host processor to discover the endpoint. The endpoint may be a V2V endpoint or a V2X endpoint.

As shown by reference number 806, the host processor may establish a connection with the endpoint. The host processor may establish the connection with the endpoint after the endpoint is discovered by the host processor. The connection may be a wireless connection, such as a secure Bluetooth connection. The host processor may initiate a handshake with the endpoint after the connection is formed between the host processor and the endpoint.

As shown by reference number 808, the host processor may receive configuration data from the endpoint, which may occur after a successful handshake is performed between the host processor and the endpoint. The host processor may receive the configuration data over a cryptographically secure channel between the host processor and the endpoint. The configuration data (e.g., a restoration image) may be for remedying the failure associated with the device (e.g., fixing the faulty device). In other words, the endpoint may possess the configuration data needed for repairing the device, and the endpoint may be able to provide the configuration data to the host processor.

As shown by reference number 810, the host processor may provide the configuration data to the device. The configuration data may be installed on the device or used to patch the device, such that the device is no longer associated with the failure. The device may be an internal primary device, and the device may be able to receive the configuration data from the endpoint, which may be an external primary device. In some implementations, the device and the endpoint may be associated with a same manufacturer for security and operational reasons. Alternatively, cross manufacturing across the device and the endpoint may be permitted.

As shown by reference number 812, the host processor may generate an alert that indicates that the second device was configured using the configuration data received from the endpoint and that the configuration data is to be reconfigured by an authorized service center. Based on the alert, the host processor may notify the authorized service center that an emergency/service teaming session was executed. The device may be flagged for a security check and a reinstallation of authorized configuration data. Once the authorized configuration data is reinstalled, the authorized configuration data may be validated and certified at the authorized service center (or trusted service point) before normal operation is able to be resumed.

In some implementations, an ability for the host processor to obtain the configuration data from the endpoint, when the authorized service center is not immediately available, may be useful in fleet operations and emergency situations.

As indicated above, FIG. 8 is provided as an example. Other examples may differ from what is described with regard to FIG. 8.

Figure 9:
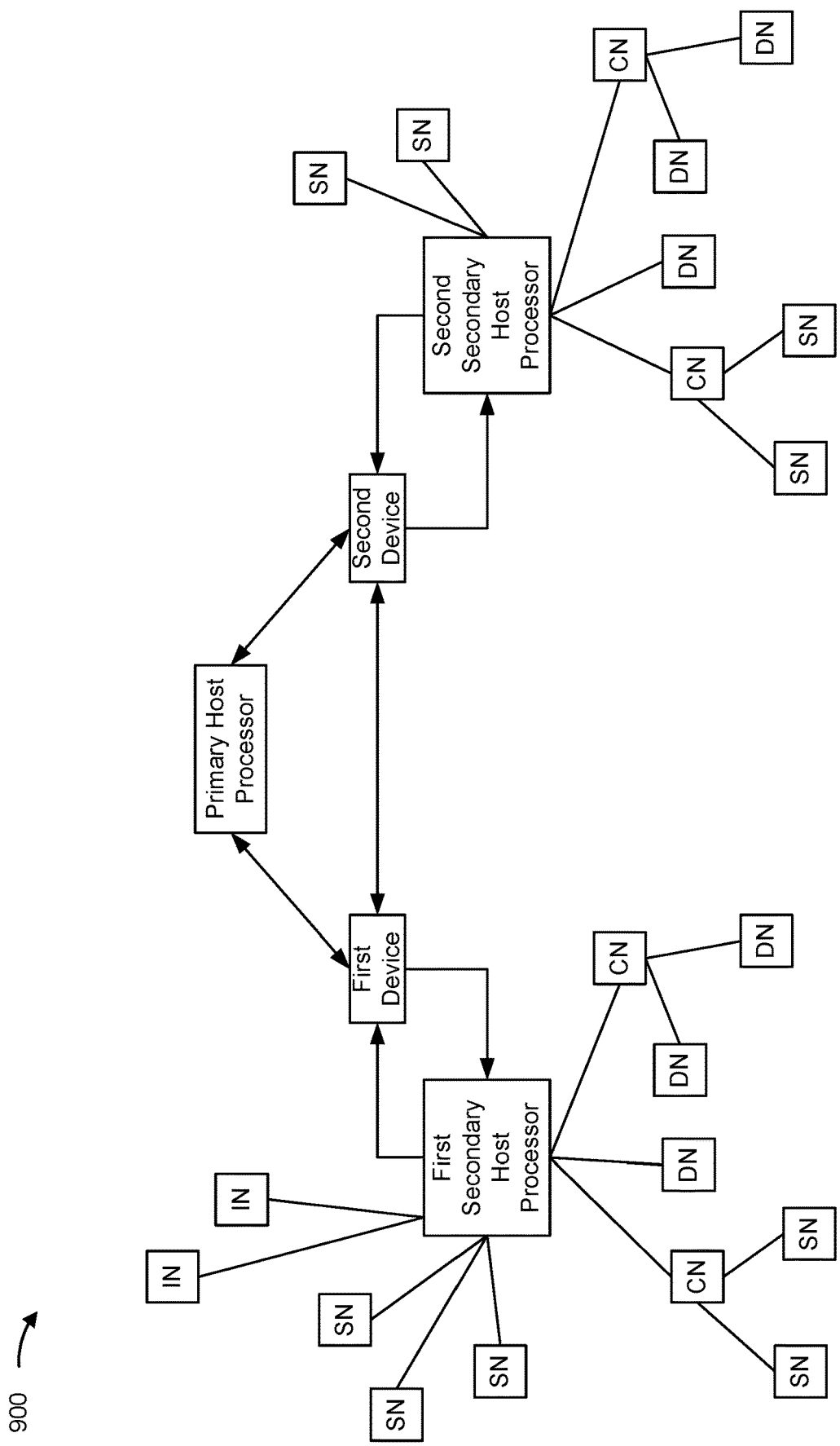
FIGS. 9-10 are diagrams illustrating example network topologies that include a primary host processor, multiple devices, and multiple secondary host processors.

FIG. 9 is a diagram illustrating an example network topology 900 that includes a primary host processor, multiple devices, and multiple secondary host processors.

As shown in FIG. 9, a primary host processor may be associated with a first device and a second device. The primary host processor, the first device, and the second device may be included in an IoT network, such as an in-vehicle IoT network. The primary host processor, the first device, and the second device may be associated with a vehicle. The first device may perform security functions for a first secondary host processor in the IoT network, where the first secondary host processor may be associated with a first set of nodes. The first set of nodes may include dumb nodes, intelligent nodes, sensor nodes, and/or control nodes. The second device may perform security functions for a second secondary host processor in the IoT network, where the second secondary host processor may be associated with a second set of nodes. The second set of nodes may include dumb nodes, intelligent nodes, sensor nodes, and/or control nodes. The first device may be able to communicate directly with the second device and/or the first device may communicate with the second device via the primary host processor.

In some implementations, the first device and the second device may be associated with different sub-systems of the vehicle. For example, the first device may be associated with a navigation system of the vehicle and the second device may be associated with a safety system of the vehicle. The first set of nodes may be associated with the navigation system, and the second set of nodes may be associated with the safety system.

In some implementations, one of the devices, such as the second device, may become associated with a failure. The second device may lose power and become offline based at least in part on the failure. The second device may experience an error and may be unable to function properly based at least in part on the failure. The other device, such as the first device, may perform security functions for the second device based on the failure associated with the second device. The first device may perform the security functions for the second set of nodes, instead of the second device, until the failure associated with the second device is resolved. The security functions performed by the first device for the second device may include a node verification and/or a user authorization, as described with respect to FIGS. 5-8.

As indicated above, FIG. 9 is provided as an example. Other examples may differ from what is described with regard to FIG. 9.

Figure 10:
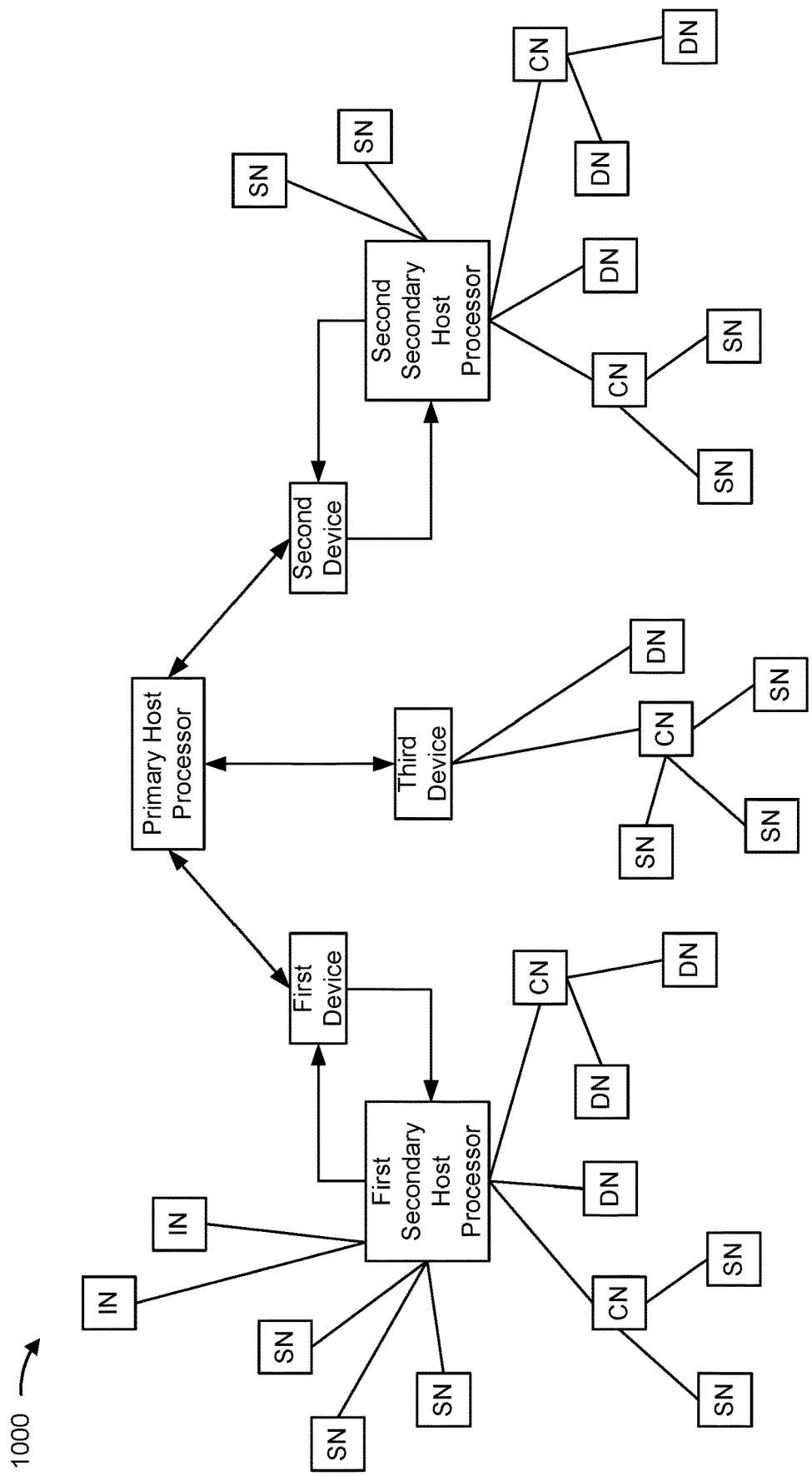

FIG. 10 is a diagram illustrating an example network topology 1000 that include a primary host processor, multiple devices, and multiple secondary host processors.

As shown in FIG. 10, a primary host processor may be associated with a first device, a second device, and a third device. The primary host processor, the first device, the second device, and the third device may be included in an IoT network, such as an in-vehicle IoT network. The primary host processor, the first device, the second device, and the third device may be associated with a vehicle (e.g., a single vehicle). Alternatively, the primary host processor, the first device, the second device, and the third device may be associated with a fleet of vehicles, factory machinery, or other suitable applications. The first device may perform security functions for a first secondary host processor in the IoT network, where the first secondary host processor may be associated with a first set of nodes. The first set of nodes may include dumb nodes, intelligent nodes, sensor nodes, and/or control nodes. The second device may perform security functions for a second secondary host processor in the IoT network, where the second secondary host processor may be associated with a second set of nodes. The second set of nodes may include dumb nodes, intelligent nodes, sensor nodes, and/or control nodes. The second device may perform security functions for a third set of nodes. The first device may communicate with the second device and the third device via the primary host processor, which may ensure that communications between devices are protected.

In some implementations, the primary host processor may perform a selection process, in which the primary host processor may select the first device to serve as a primary device. The primary host processor may select the second device and the third device to serve as secondary devices. The primary device may be able to perform a set of functions (e.g., storing information for all devices, which may allow the primary device to perform security functions for the other devices), whereas the secondary devices may be restricted to performing only a subset of functions (e.g., storing information for only itself and not for other devices, which may prevent the secondary devices from performing security functions for the other devices). In some cases, the primary host processor may not select any primary device, and each of the three devices may be secondary devices having a shared set of capabilities.

In some implementations, the first device, the second device, and the third device may be associated with different sub-systems of the vehicle. For example, the first device may be associated with a navigation system of the vehicle, the second device may be associated with a safety system of the vehicle, and the third device may be associated with an engine system of the vehicle. The first set of nodes may be associated with the navigation system, the second set of nodes may be associated with the safety system, and the third set of nodes maybe associated with the engine system.

In some implementations, one of the devices, such as the first device, the second device, or the third device, may become associated with a failure. The failure may involve a loss of power or an error that results in a failed operation. One of the other devices may perform security functions based on the failure until the failure is resolved. The security functions may include a node verification and/or a user authorization, as described with respect to FIGS. 5-8.

As indicated above, FIG. 10 is provided as an example. Other examples may differ from what is described with regard to FIG. 10.

Figure 11:
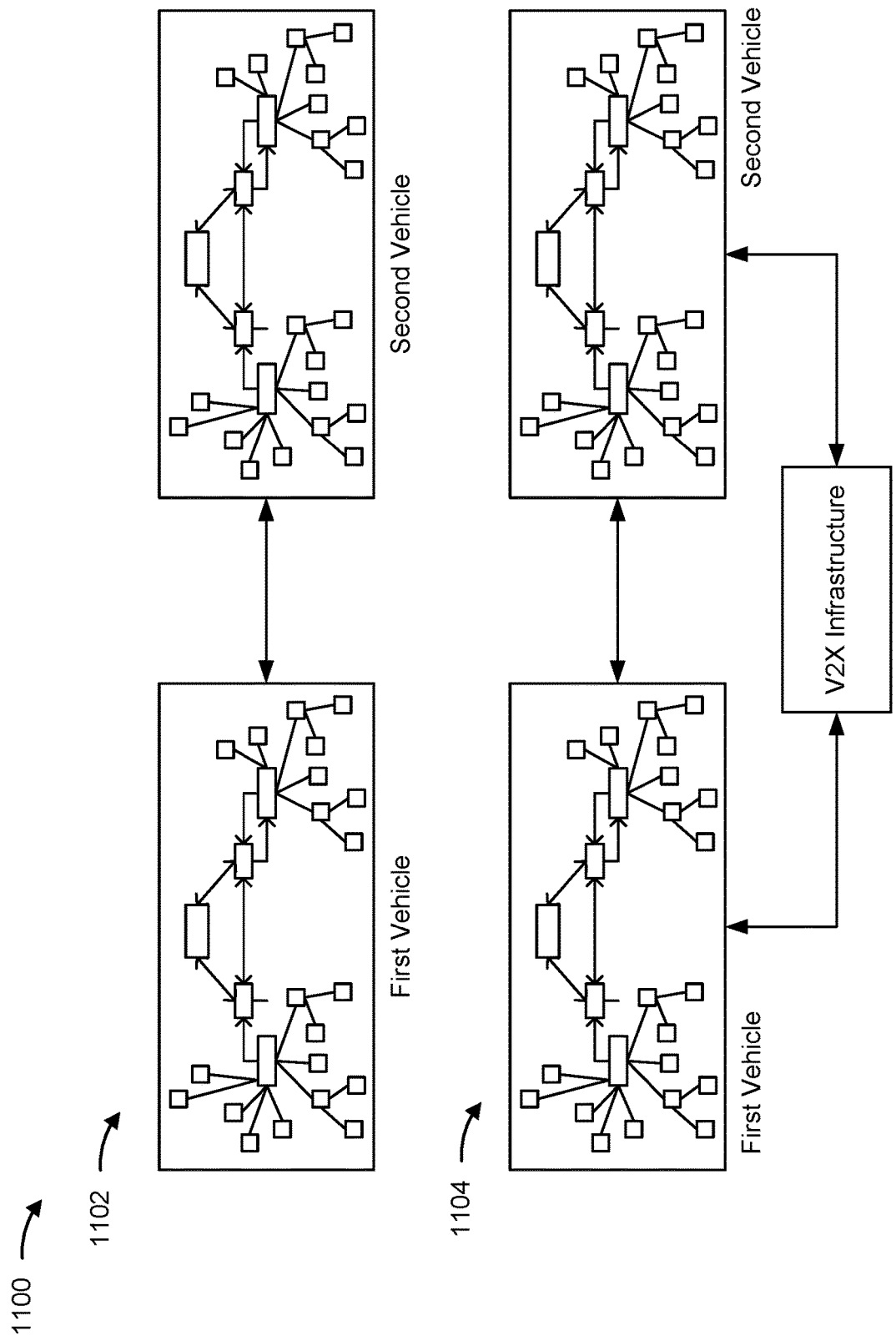
FIG. 11 is a diagram illustrating an example network topology that includes multiple vehicles, each with multiple devices.

FIG. 11 is a diagram illustrating an example network topology that includes multiple vehicles, each with multiple devices.

As shown by reference number 1102, a first vehicle may communicate directly with a second vehicle in accordance with a V2V topology. The first vehicle may include a first primary host processor, multiple devices, multiple secondary host processors, and multiple nodes associated with each of the devices. The second vehicle may include a second primary host processor, multiple devices, multiple secondary host processors, and multiple nodes associated with each of the devices. The first primary host processor of the first vehicle may communicate with the second primary host processor of the second vehicle. The first primary host processor and the second primary host processor may communicate to exchange information, such as information useful for repairing one of the devices of the first vehicle or the second vehicle.

As shown by reference number 1104, a first vehicle may communicate directly with a second vehicle in accordance with a V2X topology, and the first vehicle may communicate with the second vehicle via an endpoint, such as a V2X infrastructure, in accordance with a V2X topology. The first vehicle may include a first primary host processor, multiple devices, multiple secondary host processors, and multiple nodes associated with each of the devices. The second vehicle may include a second primary host processor, multiple devices, multiple secondary host processors, and multiple nodes associated with each of the devices. The first primary host processor of the first vehicle may communicate with the second primary host processor of the second vehicle. The first primary host processor and the second primary host processor may communicate, either directly or via the V2X infrastructure, to exchange information, such as information useful for repairing one the devices of the first vehicle or the second vehicle.

As indicated above, FIG. 11 is provided as an example. Other examples may differ from what is described with regard to FIG. 11.

FIG. 12 is a diagram of an example environment 1200 in which systems and/or methods described herein may be implemented. As shown in FIG. 12, environment 1200 may include a device 1205 (which may correspond to device 110 and device 410), a node 1210 (which may correspond to node 135 and node 440), a host processor 1215 (which may correspond to host processor 130 and primary host processor 430), and a network 1220. Devices of environment 1200 may interconnect via wired connections, wireless connections, or a combination of wired and wireless connections.

A device 1205 includes one or more devices capable of receiving, generating, storing, processing, and/or providing information associated with performing security functions using devices having embedded hardware security modules, as described elsewhere herein. The device 1205 may include a memory with an embedded hardware security module. The device 1205 may include a memory controller. The device 1205 may include one or more components configured to perform the security functions for an IoT network, such as an in-vehicle IoT network.

The host processor 1210 includes one or more devices capable of receiving, generating, storing, processing, providing, and/or routing information associated with performing security functions using devices having embedded hardware security modules, as described elsewhere herein. The host processor 1210 may include a processor, a communication device, and/or a computing device. The host processor 1210 may operate in conjunction with the device 1210 to perform the security functions for an IoT network, such as an in-vehicle IoT network.

The node 1215 includes one or more devices capable of receiving, generating, storing, processing, providing, and/or routing information associated with performing security functions using devices having embedded hardware security modules, as described elsewhere herein. The node 1215 may be included in an IoT network, such as an in-vehicle IoT network. The node 1215 may be a dumb node capable of performing a function, an intelligent node having computation and decision-making capabilities, a sensor node (e.g., a temperature sensor that outputs a temperature), or a control node that controls a dumb node, an intelligent node, and/or a sensor node.

The network 1220 includes one or more wired and/or wireless networks. For example, the network 1220 may include a cellular network, a public land mobile network, a local area network, a wide area network, a metropolitan area network, a telephone network, a private network, the Internet, and/or a combination of these or other types of networks. The network 1220 enables communication among the devices of environment 1200.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200.

Figure 13:
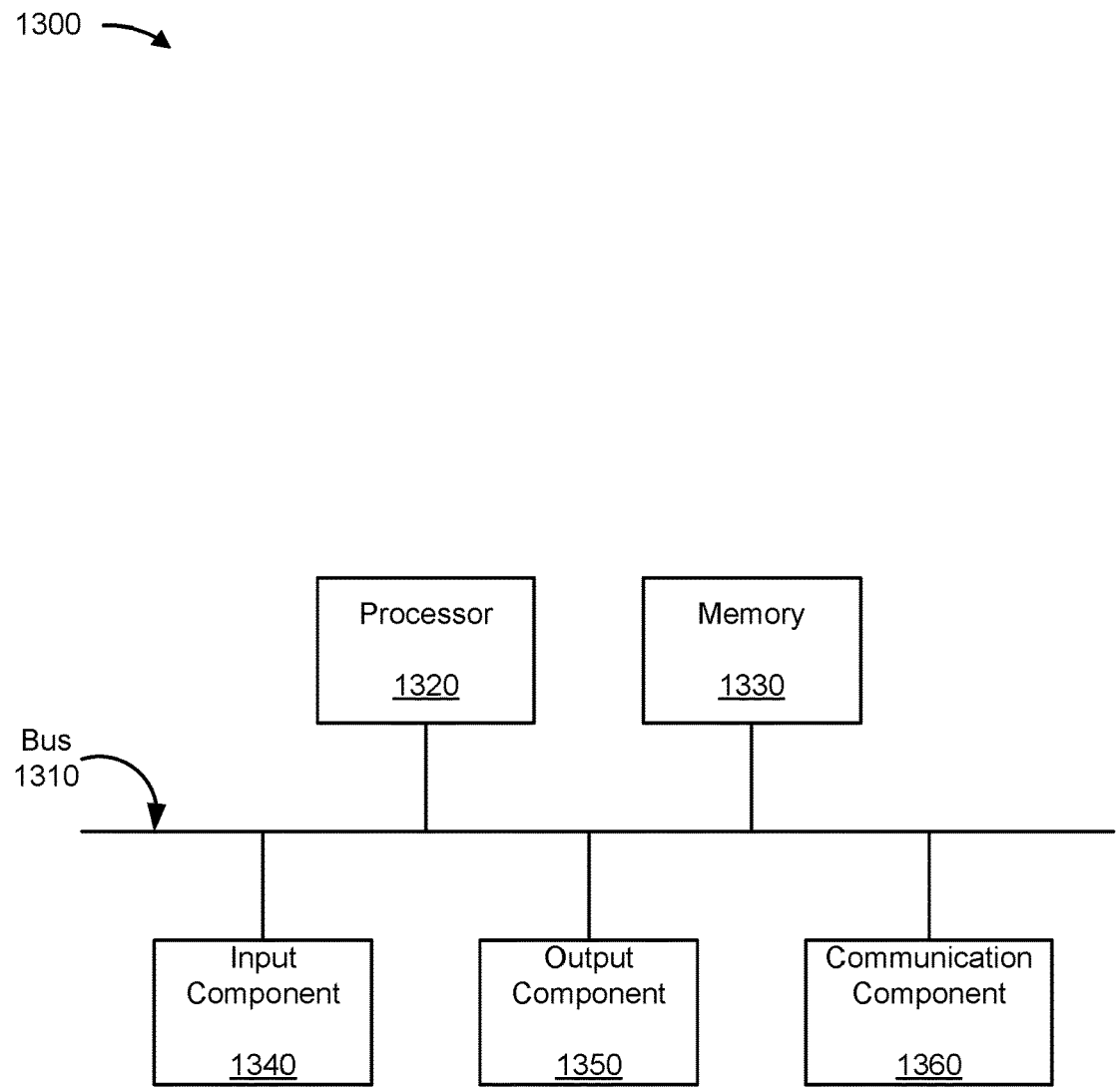
FIG. 13 is a diagram of example components of one or more devices of FIG. 1, FIG. 4, and/or FIG. 12.

FIG. 13 is a diagram of example components of a device 1300, which may correspond to device 110, host processor 130, node 135, device 410, primary host processor 430, node 440, device 1205, host processor 1210, and/or node 1215. In some implementations, device 110, host processor 130, node 135, device 410, primary host processor 430, node 440, device 1205, host processor 1210, and/or node 1215 include one or more devices 1300 and/or one or more components of device 1300. As shown in FIG. 13, device 1300 may include a bus 1310, a processor 1320, a memory 1330, an input component 1340, an output component 1350, and a communication component 1360.

Bus 1310 includes one or more components that enable wired and/or wireless communication among the components of device 1300. Bus 1310 may couple together two or more components of FIG. 13, such as via operative coupling, communicative coupling, electronic coupling, and/or electric coupling. Processor 1320 includes a central processing unit, a graphics processing unit, a microprocessor, a controller, a microcontroller, a digital signal processor, a field-programmable gate array, an application-specific integrated circuit, and/or another type of processing component. Processor 1320 is implemented in hardware, firmware, or a combination of hardware and software. In some implementations, processor 1320 includes one or more processors capable of being programmed to perform one or more operations or processes described elsewhere herein.

Memory 1330 includes volatile and/or nonvolatile memory. For example, memory 1330 may include random access memory (RAM), read only memory (ROM), a hard disk drive, and/or another type of memory (e.g., a flash memory, a magnetic memory, and/or an optical memory). Memory 1330 may include internal memory (e.g., RAM, ROM, or a hard disk drive) and/or removable memory (e.g., removable via a universal serial bus connection). Memory 1330 may be a non-transitory computer-readable medium. Memory 1330 stores information, instructions, and/or software (e.g., one or more software applications) related to the operation of device 1300. In some implementations, memory 1330 includes one or more memories that are coupled to one or more processors (e.g., processor 1320), such as via bus 1310.

Input component 1340 enables device 1300 to receive input, such as user input and/or sensed input. For example, input component 1340 may include a touch screen, a keyboard, a keypad, a mouse, a button, a microphone, a switch, a sensor, a global positioning system sensor, an accelerometer, a gyroscope, and/or an actuator. Output component 1350 enables device 1300 to provide output, such as via a display, a speaker, and/or a light-emitting diode. Communication component 1360 enables device 1300 to communicate with other devices via a wired connection and/or a wireless connection. For example, communication component 1360 may include a receiver, a transmitter, a transceiver, a modem, a network interface card, and/or an antenna.

Device 1300 may perform one or more operations or processes described herein. For example, a non-transitory computer-readable medium (e.g., memory 1330) may store a set of instructions (e.g., one or more instructions or code) for execution by processor 1320. Processor 1320 may execute the set of instructions to perform one or more operations or processes described herein. In some implementations, execution of the set of instructions, by one or more processors 1320, causes the one or more processors 1320 and/or the device 1300 to perform one or more operations or processes described herein. In some implementations, hardwired circuitry is used instead of or in combination with the instructions to perform one or more operations or processes described herein. Additionally, or alternatively, processor 1320 may be configured to perform one or more operations or processes described herein. Thus, implementations described herein are not limited to any specific combination of hardware circuitry and software.

The number and arrangement of components shown in FIG. 13 are provided as an example. Device 1300 may include additional components, fewer components, different components, or differently arranged components than those shown in FIG. 13. Additionally, or alternatively, a set of components (e.g., one or more components) of device 1300 may perform one or more functions described as being performed by another set of components of device 1300.

Figure 14:
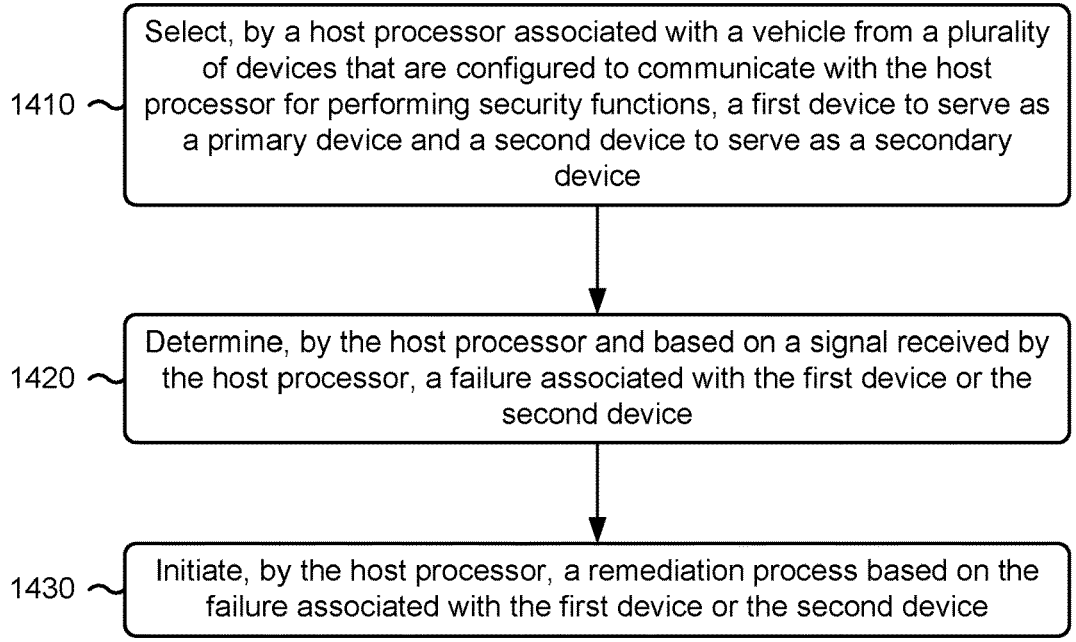
FIGS. 14-15 are flowcharts of example processes of performing security functions using devices having embedded hardware security modules.

FIG. 14 is a flowchart of an example method 1400 associated with performing security functions using devices having embedded hardware security modules. In some implementations, one or more process blocks of FIG. 14 may be performed by a host processor (e.g., host processor 130, primary host processor 430, and/or host processor 1215). In some implementations, one or more process blocks of FIG. 14 may be performed by another device or a group of devices separate from or including the host processor, such as device 110, device 410, and/or device 1205. Additionally, or alternatively, one or more process blocks of FIG. 14 may be performed by one or more components of device 1300, such as processor 1320, memory 1330, input component 1340, output component 1350, and/or communication component 1360.

As shown in FIG. 14, the method 1400 may include selecting, by a host processor associated with a vehicle from a plurality of devices that are configured to communicate with the host processor for performing security functions, a first device to serve as a primary device and a second device to serve as a secondary device (block 1410). The first device may include a first memory with an embedded hardware security module and may be associated with a first set of nodes of the vehicle. The second device may include a second memory with an embedded hardware security module and may be associated with a second set of nodes of the vehicle. The first memory and the second memory may store information that enables security functions to be performed, in conjunction with the host processor, including one or more of: a node verification to verify that a node of the vehicle has not been tampered with, or a user authorization of a user that attempts to modify the node or replace the node or insert a new node in the vehicle. The first memory and the second memory may serve as a root of trust for the host processor. As further shown in FIG. 14, the method 1400 may include determining, by the host processor and based on a signal received by the host processor, a failure associated with the first device or the second device (block 1420). As further shown in FIG. 14, the method 1400 may include initiating, by the host processor, a remediation process based on the failure associated with the first device or the second device (block 1430).

Although FIG. 14 shows example blocks of a method 1400, in some implementations, the method 1400 may include additional blocks, fewer blocks, different blocks, or differently arranged blocks than those depicted in FIG. 14. Additionally, or alternatively, two or more of the blocks of the method 1400 may be performed in parallel. The method 1400 is an example of one method that may be performed by one or more devices described herein. These one or more devices may perform one or more other methods based on operations described herein, such as the operations described in connection with FIGS. 1-11.

Figure 15:
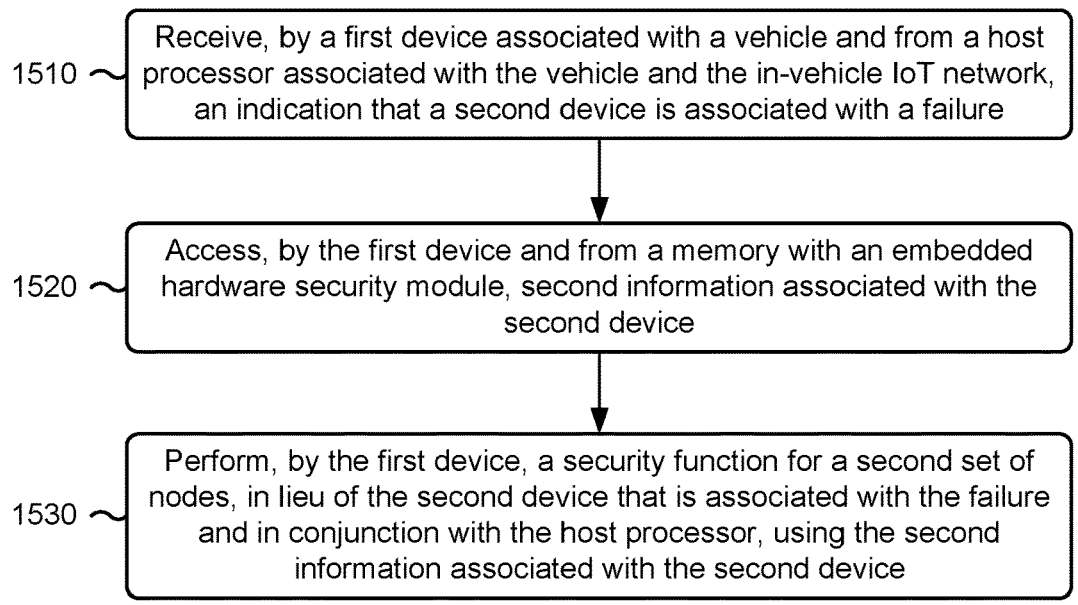

FIG. 15 is a flowchart of an example method 1500 associated with performing security functions using devices having embedded hardware security modules. In some implementations, one or more process blocks of FIG. 15 may be performed by a device (e.g., device 110, device 410, and/or device 1205). In some implementations, one or more process blocks of FIG. 15 may be performed by another device or a group of devices separate from or including the device, such as host processor 130, primary host processor 430, and/or host processor 1215. Additionally, or alternatively, one or more process blocks of FIG. 15 may be performed by one or more components of device 1300, such as processor 1320, memory 1330, input component 1340, output component 1350, and/or communication component 1360.

As shown in FIG. 15, the method 1500 may include receiving, by a first device associated with a vehicle and from a host processor associated with the vehicle and the in-vehicle IoT network, an indication that a second device is associated with a failure (block 1510). The first device may be associated with a first set of nodes in the vehicle and the second device may be associated with a second set of nodes in the vehicle. The first device may include a memory with an embedded hardware security module. The memory may store first information associated with the first device and second information associated with a second device. The first device and the second device may be associated with an in-vehicle IoT network. As further shown in FIG. 15, the method 1500 may include accessing, by the first device and from the memory with the embedded hardware security module, the second information associated with the second device (block 1520). The second information may include one or more of node information or user information associated with the second set of nodes. As further shown in FIG. 15, the method 1500 may include performing, by the first device, a security function for the second set of nodes, in lieu of the second device that is associated with the failure and in conjunction with the host processor, using the second information associated with the second device (block 1530). The security function may include one or more of: a node verification to verify that a node of the second set of nodes of the vehicle has not been tampered with, or a user authorization of a user that attempts to modify the node or replace the node or insert a new node in the second set of nodes of the vehicle.

Although FIG. 15 shows example blocks of a method 1500, in some implementations, the method 1500 may include additional blocks, fewer blocks, different blocks, or differently arranged blocks than those depicted in FIG. 15. Additionally, or alternatively, two or more of the blocks of the method 1500 may be performed in parallel. The method 1500 is an example of one method that may be performed by one or more devices described herein. These one or more devices may perform one or more other methods based on operations described herein, such as the operations described in connection with FIGS. 1-11.

In some implementations, a host processor associated with a vehicle includes one or more components configured to: select, from a plurality of devices that are configured to communicate with the host processor for performing security functions, a first device to serve as a primary device and a second device to serve as a secondary device, wherein: the first device includes a first memory with an embedded hardware security module and is associated with a first set of nodes of the vehicle, the second device includes a second memory with an embedded hardware security module and is associated with a second set of nodes of the vehicle, the first memory and the second memory store information that enables security functions to be performed, in conjunction with the host processor, including one or more of: a node verification to verify that a node of the vehicle has not been tampered with, or a user authorization of a user that attempts to modify the node or replace the node or insert a new node in the vehicle; and the first memory and the second memory serve as a root of trust for the host processor; determine, based on a signal received by the host processor, a failure associated with the first device or the second device; and initiate a remediation process based on the failure associated with the first device or the second device.

In some implementations, a first device associated with a vehicle includes a memory with an embedded hardware security module, wherein the memory stores first information associated with the first device and second information associated with a second device, and wherein the first device and the second device are associated with an in-vehicle IoT network; and one or more components configured to: receive, from a host processor associated with the vehicle and the in-vehicle IoT network, an indication that the second device is associated with a failure, wherein the first device is associated with a first set of nodes in the vehicle and the second device is associated with a second set of nodes in the vehicle; access, from the memory with the embedded hardware security module, the second information associated with the second device, wherein the second information includes one or more of node information or user information associated with the second set of nodes; and perform a security function for the second set of nodes, in lieu of the second device that is associated with the failure and in conjunction with the host processor, using the second information associated with the second device, wherein the security function includes one or more of: a node verification to verify that a node of the second set of nodes of the vehicle has not been tampered with, or a user authorization of a user that attempts to modify the node or replace the node or insert a new node in the second set of nodes of the vehicle.

In some implementations, a system includes a primary host associated with a vehicle; a first device in communication with the primary host and a first secondary host, wherein the first device includes a first memory with an embedded hardware security module; the first secondary host in communication with the first device and a first set of nodes of the vehicle; a second device in communication with the primary host, the first device, and a second secondary host, wherein the second device includes a second memory with an embedded hardware security module; and the second secondary host in communication with the second device and a second set of nodes of the vehicle, wherein the first device comprises one or more components configured to perform security functions for the first set of nodes, in conjunction with the first secondary host, using first information stored in the first memory, and wherein the security functions for the first set of nodes include at least one of: a node verification of a node included in the first set of nodes, or a user authorization based on an attempt to modify or replace the node included in the first set of nodes, and wherein the second device comprises one or more components configured to perform security functions for the second set of nodes, in conjunction with the second secondary host, using second information stored in the second memory, and wherein the security functions for the second set of nodes include at least one of: a node verification of a node included in the second set of nodes, or a user authorization based on an attempt to modify or replace the node included in the second set of nodes.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the term "component" is intended to be broadly construed as hardware, firmware, or a combination of hardware and software. As used herein, the term "logic" is intended to be broadly construed as hardware, firmware, or a combination of hardware and software. As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A host processor associated with a vehicle, comprising:
one or more components configured to:
select, from a plurality of devices that are configured to communicate with the host processor for performing security functions, a first device to serve as a primary device and a second device to serve as a secondary device, wherein:
the first device includes a first memory with an embedded hardware security module and is associated with a first set of nodes of the vehicle,
the second device includes a second memory with an embedded hardware security module and is associated with a second set of nodes of the vehicle,
the first memory and the second memory store information that enables security functions to be performed, in conjunction with the host processor, including one or more of: a node verification to verify that a node of the vehicle has not been tampered with, or a user authorization of a user that attempts to modify the node or replace the node or insert a new node in the vehicle,
the first memory stores first information that enables the first device to perform security functions for the first set of nodes, and second information that enables the first device to perform security functions for the second set of nodes;
the second memory stores the second information that enables the second device to perform security functions for the second set of nodes, and
the second memory does not store the first information;
determine, based on a signal received by the host processor, a failure associated with the first device or the second device; and
initiate a remediation process based on the failure associated with the first device or the second device.

2. The host processor of claim 1, wherein the one or more components are configured to:

determine that the failure is associated with the second device; and instruct, based on initiating the remediation process, the first device to perform the security functions for the second set of nodes in lieu of the second device that is associated with the failure.

3. A host processor associated with a vehicle, comprising: one or more components configured to:
  select, from a plurality of devices that are configured to communicate with the host processor for performing security functions, a first device to serve as a primary device and a second device to serve as a secondary device, wherein:
    the first device includes a first memory with an embedded hardware security module and is associated with a first set of nodes of the vehicle,
    the second device includes a second memory with an embedded hardware security module and is associated with a second set of nodes of the vehicle,
    the first memory and the second memory store information that enables security functions to be performed, in conjunction with the host processor, including one or more of: a node verification to verify that a node of the vehicle has not been tampered with, or a user authorization of a user that attempts to modify the node or replace the node or insert a new node in the vehicle, and
    the first memory and the second memory serve as a root of trust for the host processor;
  determine, based on a signal received by the host processor, a failure associated with the first device;
  initiate a remediation process based on the failure associated with the first device;
  select, based on initiating the remediation process, the second device to serve as the primary device; and
  provide, for storage in the second memory of the second device, information that enables the second device to perform security functions for the first set of nodes.

4. The host processor of claim 1, wherein the one or more components are configured to:
  determine that the failure is associated with the second device; and
  reconfigure, based on initiating the remediation process, the second device to store information that enables the second device to perform security functions for the second set of nodes, wherein the information is retrieved from the first memory of the first device.

5. The host processor of claim 1, wherein the one or more components are configured to:
  determine a failure associated with a third device of the plurality of devices; and
  exclude the third device as a candidate for serving as the primary device when selecting the first device to serve as the primary device.

6. The host processor of claim 1, wherein the one or more components are configured to:
  determine that the failure is associated with the second device and not with the first device;
  determine that remaining devices, of the plurality of devices, are associated with failures; and
  generate, based on initiating the remediation process, an alert that indicates that the second device and the remaining devices are associated with failures.

7. The host processor of claim 1, wherein the one or more components are configured to:
  determine that the failure is associated with the second device;
  determine that the plurality of devices including the first device are associated with failures; and
  generate, based on initiating the remediation process, an alert that indicates that the plurality of devices are associated with failures.

8. The host processor of claim 1, wherein the one or more components are configured to:
  compare the first device or the second device against a validated device; and
  determine, based on comparing the first device or the second device, that the first device or the second device is valid, wherein the validated device is established in a factory and is not installed in a customer environment.

9. The host processor of claim 1, wherein the one or more components are configured to:
  receive, from a server, an over-the-air (OTA) update;
  instruct the second device to become offline and unavailable to the second set of nodes;
  provide the OTA update to the second device;
  reset the second device after the OTA update is installed on the second device; and
  instruct the second device to become online and available to the second set of nodes after resetting the second device.

10. The host processor of claim 9, wherein the one or more components are further configured to:
  instruct the second device to serve as the primary device and instruct the first device to serve as the secondary device;
  instruct the first device to become offline and unavailable to the first set of nodes;
  provide the OTA update to the first device;
  reset the first device after the OTA update is installed on the first device;
  instruct the first device to become online and available to the first set of nodes after resetting the first device; and
  instruct the first device to serve as the primary device and instruct the second device to serve as the secondary device.

11. The host processor of claim 1, wherein the one or more components are configured to:
  determine that the failure is associated with the second device;
  detect an endpoint and establish a connection with the endpoint;
  receive configuration data from the endpoint;
  provide the configuration data to the second device associated with the failure; and
  generate an alert that indicates that the second device was configured using the configuration data received from the endpoint and that the configuration data is to be reconfigured by an authorized service center.

12. The host processor of claim 11, wherein the endpoint is a vehicle-to-vehicle (V2V) endpoint or a vehicle-to-everything (V2X) endpoint, and wherein the second device and the endpoint are associated with a same manufacturer.

13. The host processor of claim 1, wherein the host processor is a vehicle host processor.

14. The host processor of claim 1, wherein the vehicle is a first vehicle, wherein the first device is configured to communicate with a third device associated with a second vehicle via the host processor, and wherein the third device is associated with a third set of nodes of the second vehicle.

15. A first device associated with a vehicle, comprising:

a memory with an embedded hardware security module, wherein the memory stores first information associated with the first device and second information associated with a second device, and wherein the first device and the second device are associated with an in-vehicle Internet of Things (IoT) network; and one or more components configured to:

receive, from a host processor associated with the vehicle and the in-vehicle IoT network, an indication that the second device is associated with a failure, wherein the first device is associated with a first set of nodes in the vehicle and the second device is associated with a second set of nodes in the vehicle;

access, from the memory with the embedded hardware security module, the second information associated with the second device, wherein the second information includes one or more of node information or user information associated with the second set of nodes; and perform a security function for the second set of nodes, in lieu of the second device that is associated with the failure and in conjunction with the host processor, using the second information associated with the second device, wherein the security function includes one or more of: a node verification to verify that a node of the second set of nodes of the vehicle has not been tampered with, or a user authorization of a user that attempts to modify the node or replace the node or insert a new node in the second set of nodes of the vehicle.

16. The first device of claim 15, wherein the one or more components, to perform the security function, are configured to:

determine, during a node verification, that a tampering with a node of the second set of nodes has occurred based on a comparison of a true node identity, as indicated by the second information associated with the second device, with a candidate node identity; and generate an alert indicating the tampering with the node.

17. The first device of claim 15, wherein the one or more components, to perform the security function, are configured to:

determine, during a user authorization, that a user is not authorized based on a comparison of a true user credential, as indicated by the second information associated with the second device, with a candidate user credential; and generate an alert indicating that the user is not authorized.

18. The first device of claim 15, wherein the one or more components are further configured to:

perform a security function for the first set of nodes using the first information associated with the first device, wherein the security function is associated with one of a node verification or a user authorization associated with the first set of nodes.

19. The first device of claim 15, wherein a node of the first set of nodes or the second set of nodes is one of:

a dumb node capable of performing a function;

an intelligent node having a computation and decision-making capability;

a sensor node capable of reporting sensory data on-demand or in accordance with a defined periodicity; or a control node capable of controlling the dumb node, the intelligent node, or the sensor node.

20. A system, comprising:

a primary host associated with a vehicle;

a first device in communication with the primary host and a first secondary host, wherein the first device includes a first memory with an embedded hardware security module;

the first secondary host in communication with the first device and a first set of nodes of the vehicle;

a second device in communication with the primary host, the first device, and a second secondary host, wherein the second device includes a second memory with an embedded hardware security module; and the second secondary host in communication with the second device and a second set of nodes of the vehicle, wherein the first device comprises one or more components configured to perform security functions for the first set of nodes, in conjunction with the first secondary host, using first information stored in the first memory, and wherein the security functions for the first set of nodes include at least one of: a node verification of a node included in the first set of nodes, or a user authorization based on an attempt to modify or replace the node included in the first set of nodes, and wherein the second device comprises one or more components configured to perform security functions for the second set of nodes, in conjunction with the second secondary host, using second information stored in the second memory, and wherein the security functions for the second set of nodes include at least one of: a node verification of a node included in the second set of nodes, or a user authorization based on an attempt to modify or replace the node included in the second set of nodes.

21. The system of claim 20, wherein the primary host comprises one or more components configured to:

detect, based on a signal received from the first device or the second device, a failure associated with the first device that prevents the first device from performing the security functions for the first set of nodes; and instruct the second device to perform the security functions for the first set of nodes in lieu of the first device, wherein the first information stored in the first memory is replicated in the second memory and used by the second device to perform the security functions for the first set of nodes.

22. The system of claim 21, wherein the primary host further comprises one or more components configured to:

determine that the first device is no longer associated with the failure; and instruct the second device to stop performing the security functions for the first set of nodes in lieu of the first device.

23. The system of claim 21, wherein the node verification is based on a modification to a node of the first set of nodes, a replacement of the node, or a newly added node to the first set of nodes.

24. The system of claim 20, wherein the primary host comprises one or more components configured to:

detect, based on a signal received from the first device or the second device, a failure associated with the first device;

deactivate the first device based on the failure associated with the first device; and transmit, to a computing device associated with an authorized service center, an alert indicating the failure associated with the first device.

\* \* \* \* \*